US008620572B2

(12) United States Patent
Nielsen et al.

(10) Patent No.: US 8,620,572 B2
(45) Date of Patent: Dec. 31, 2013

(54) MARKING DEVICE WITH TRANSMITTER FOR TRIANGULATING LOCATION DURING LOCATE OPERATIONS

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 430 days.

(21) Appl. No.: 12/859,394

(22) Filed: Aug. 19, 2010

(65) Prior Publication Data

US 2011/0117272 A1    May 19, 2011

Related U.S. Application Data

(60) Provisional application No. 61/235,529, filed on Aug. 20, 2009.

(30) Foreign Application Priority Data

Aug. 13, 2010   (CA) ...................................... 2713282

(51) Int. Cl.
  *G01C 21/00*    (2006.01)
(52) U.S. Cl.
  USPC ......................................... 701/408; 701/468
(58) Field of Classification Search
  USPC ............. 701/408, 468, 517, 526; 342/357.39,
                342/357.2, 450, 459, 463
  See application file for complete search history.

(56) References Cited

U.S. PATENT DOCUMENTS

| | | | |
|---|---|---|---|
| 3,871,557 | A | 3/1975 | Smrt |
| 3,972,038 | A | 7/1976 | Fletcher et al. |
| 3,974,491 | A | 8/1976 | Sipe |
| 3,988,922 | A | 11/1976 | Clark et al. |
| 4,258,320 | A | 3/1981 | Schonstedt |
| 4,387,340 | A | 6/1983 | Peterman |
| 4,388,592 | A | 6/1983 | Schonstedt |
| 4,520,317 | A | 5/1985 | Peterman |
| 4,536,710 | A | 8/1985 | Dunham |
| 4,539,522 | A | 9/1985 | Schonstedt |
| 4,590,425 | A | 5/1986 | Schonstedt |

(Continued)

FOREIGN PATENT DOCUMENTS

| CA | 2623761 | 10/2008 |
|---|---|---|
| CA | 2623466 | 6/2011 |

(Continued)

OTHER PUBLICATIONS

U.S. Appl. No. 13/686,262, filed Nov. 27, 2012, Nielsen et al.

(Continued)

*Primary Examiner* — Mark Hellner

(57) ABSTRACT

Methods, apparatus and systems for determining the location of a marking device during performance of a marking operation using triangulation are described. The marking device may be of the type used to mark the presence or absence of underground facilities and may include a marking material dispenser to dispense marking material as an indicator. The marking device may include a transmitter which transmits a signal received by a receiving system including two or more receiving devices at separate locations. Triangulation algorithms may then be used to determine the location of the marking device relative to the receiving system.

22 Claims, 11 Drawing Sheets

(56) References Cited

U.S. PATENT DOCUMENTS

| | | | |
|---|---|---|---|
| 4,623,282 A | 11/1986 | Allen | |
| 4,639,674 A | 1/1987 | Rippingale | |
| 4,712,094 A | 12/1987 | Bolson, Sr. | |
| 4,747,207 A | 5/1988 | Schonstedt et al. | |
| 4,803,773 A | 2/1989 | Schonstedt | |
| 4,818,944 A | 4/1989 | Rippingale | |
| 4,839,623 A | 6/1989 | Schonstedt et al. | |
| 4,839,624 A | 6/1989 | Schonstedt | |
| 4,873,533 A | 10/1989 | Oike | |
| 4,899,293 A | 2/1990 | Dawson et al. | |
| 4,989,151 A | 1/1991 | Nuimura | |
| 5,001,430 A | 3/1991 | Peterman et al. | |
| 5,006,806 A | 4/1991 | Rippingale et al. | |
| 5,014,008 A | 5/1991 | Flowerdew | |
| 5,017,873 A | 5/1991 | Rippingale et al. | |
| 5,025,150 A | 6/1991 | Oldham et al. | |
| 5,043,666 A | 8/1991 | Tavernetti et al. | |
| 5,045,368 A | 9/1991 | Cosman et al. | |
| 5,065,098 A | 11/1991 | Salsman et al. | |
| 5,093,622 A | 3/1992 | Balkman | |
| 5,097,211 A | 3/1992 | Schonstedt | |
| 5,114,517 A | 5/1992 | Rippingale et al. | |
| 5,122,750 A | 6/1992 | Rippingale et al. | |
| 5,136,245 A | 8/1992 | Schonstedt | |
| 5,138,761 A | 8/1992 | Schonstedt | |
| 5,150,295 A | 9/1992 | Mattingly | |
| 5,173,139 A | 12/1992 | Rippingale et al. | |
| 5,206,065 A | 4/1993 | Rippingale et al. | |
| 5,214,757 A | 5/1993 | Mauney et al. | |
| 5,231,355 A | 7/1993 | Rider et al. | |
| 5,239,290 A | 8/1993 | Schonstedt | |
| 5,260,659 A | 11/1993 | Flowerdew et al. | |
| 5,264,795 A | 11/1993 | Rider | |
| 5,299,300 A | 3/1994 | Femal | |
| 5,329,464 A | 7/1994 | Sumic et al. | |
| 5,361,029 A | 11/1994 | Rider | |
| 5,365,163 A | 11/1994 | Satterwhite et al. | |
| 5,373,298 A | 12/1994 | Karouby | |
| 5,379,045 A * | 1/1995 | Gilbert et al. | 342/357.36 |
| 5,381,338 A | 1/1995 | Wysocki | |
| 5,414,462 A | 5/1995 | Veatch | |
| 5,430,379 A | 7/1995 | Parkinson et al. | |
| 5,444,364 A | 8/1995 | Satterwhite et al. | |
| 5,467,271 A | 11/1995 | Abel et al. | |
| 5,471,143 A | 11/1995 | Doany | |
| 5,486,067 A | 1/1996 | Huynh | |
| 5,490,646 A | 2/1996 | Shaw | |
| 5,517,419 A | 5/1996 | Lanckton | |
| 5,519,329 A | 5/1996 | Satterwhite | |
| 5,529,433 A | 6/1996 | Huynh | |
| 5,530,357 A | 6/1996 | Cosman et al. | |
| 5,543,931 A | 8/1996 | Lee et al. | |
| 5,553,407 A | 9/1996 | Stump | |
| 5,568,162 A | 10/1996 | Samsel et al. | |
| 5,576,973 A | 11/1996 | Haddy | |
| 5,621,325 A | 4/1997 | Draper et al. | |
| 5,629,626 A | 5/1997 | Russell et al. | |
| 5,644,237 A | 7/1997 | Eslambolchi et al. | |
| 5,659,985 A | 8/1997 | Stump | |
| 5,673,050 A | 9/1997 | Moussally et al. | |
| 5,689,415 A | 11/1997 | Calotychos et al. | |
| 5,699,244 A | 12/1997 | Clark, Jr. | |
| 5,704,142 A | 1/1998 | Stump | |
| 5,739,785 A | 4/1998 | Allison et al. | |
| 5,751,289 A | 5/1998 | Myers | |
| 5,751,450 A | 5/1998 | Robinson | |
| 5,764,127 A | 6/1998 | Hore et al. | |
| 5,769,370 A | 6/1998 | Ashjaee | |
| 5,815,411 A | 9/1998 | Ellenby | |
| 5,819,859 A | 10/1998 | Stump et al. | |
| 5,828,219 A | 10/1998 | Hanlon et al. | |
| 5,848,373 A | 12/1998 | Delorme et al. | |
| 5,916,300 A | 6/1999 | Kirk et al. | |
| 5,917,325 A | 6/1999 | Smith | |
| 5,918,565 A | 7/1999 | Casas | |
| 5,920,194 A | 7/1999 | Lewis et al. | |
| 5,955,667 A | 9/1999 | Fyfe | |
| 5,987,380 A | 11/1999 | Backman | |
| 6,026,135 A | 2/2000 | McFee et al. | |
| 6,031,454 A | 2/2000 | Lovejoy et al. | |
| 6,032,530 A | 3/2000 | Hock | |
| 6,037,010 A | 3/2000 | Kahmann et al. | |
| 6,053,260 A | 4/2000 | Boon | |
| 6,061,632 A | 5/2000 | Dreier | |
| 6,064,940 A | 5/2000 | Rodgers | |
| 6,074,693 A | 6/2000 | Manning | |
| 6,075,481 A * | 6/2000 | Eslambolchi et al. | 342/357.31 |
| 6,095,081 A | 8/2000 | Gochenour | |
| 6,101,087 A | 8/2000 | Sutton | |
| 6,107,801 A | 8/2000 | Hopwood | |
| 6,119,376 A | 9/2000 | Stump | |
| 6,127,827 A | 10/2000 | Lewis | |
| 6,130,539 A | 10/2000 | Polak | |
| 6,138,906 A | 10/2000 | DeMayo | |
| 6,140,819 A | 10/2000 | Peterman et al. | |
| 6,169,958 B1 | 1/2001 | Nagasamy et al. | |
| 6,188,392 B1 | 2/2001 | O'Connor et al. | |
| 6,188,777 B1 | 2/2001 | Darrell et al. | |
| 6,206,282 B1 | 3/2001 | Hayes, Sr. et al. | |
| 6,234,218 B1 | 5/2001 | Boers | |
| 6,240,360 B1 | 5/2001 | Phelan | |
| 6,268,731 B1 | 7/2001 | Hopwood et al. | |
| 6,282,477 B1 | 8/2001 | Gudat et al. | |
| 6,285,911 B1 | 9/2001 | Watts et al. | |
| 6,292,108 B1 | 9/2001 | Straser et al. | |
| 6,294,022 B1 | 9/2001 | Eslambolchi et al. | |
| 6,297,736 B1 | 10/2001 | Lewis et al. | |
| 6,299,934 B1 | 10/2001 | Manning | |
| 6,308,565 B1 | 10/2001 | French et al. | |
| 6,320,518 B2 | 11/2001 | Saeki et al. | |
| RE37,574 E | 3/2002 | Rawlins | |
| 6,356,082 B1 | 3/2002 | Alkire et al. | |
| 6,363,320 B1 | 3/2002 | Chou | |
| 6,375,038 B1 | 4/2002 | Daansen et al. | |
| 6,378,220 B1 | 4/2002 | Baioff et al. | |
| 6,388,629 B1 | 5/2002 | Albats et al. | |
| 6,390,336 B1 | 5/2002 | Orozco | |
| 6,401,051 B1 | 6/2002 | Merriam | |
| 6,407,550 B1 | 6/2002 | Parakulam et al. | |
| 6,411,094 B1 | 6/2002 | Gard et al. | |
| 6,426,872 B1 | 7/2002 | Sutton | |
| 6,437,708 B1 | 8/2002 | Brouwer | |
| 6,438,239 B1 | 8/2002 | Kuechen | |
| 6,459,266 B1 | 10/2002 | Fling | |
| 6,476,708 B1 | 11/2002 | Johnson | |
| 6,477,588 B1 | 11/2002 | Yerazunis | |
| 6,490,524 B1 | 12/2002 | White et al. | |
| 6,493,650 B1 | 12/2002 | Rodgers | |
| 6,512,478 B1 | 1/2003 | Chien | |
| 6,526,400 B1 | 2/2003 | Takata | |
| 6,549,011 B2 | 4/2003 | Flatt | |
| 6,552,548 B1 | 4/2003 | Lewis et al. | |
| 6,585,133 B1 | 7/2003 | Brouwer | |
| 6,600,420 B2 | 7/2003 | Goff et al. | |
| 6,617,856 B1 | 9/2003 | Royle et al. | |
| 6,633,163 B2 | 10/2003 | Fling | |
| 6,650,293 B1 | 11/2003 | Eslambolchi | |
| 6,650,798 B2 | 11/2003 | Russell et al. | |
| 6,658,148 B1 | 12/2003 | Fung et al. | |
| 6,674,276 B2 | 1/2004 | Morgan et al. | |
| 6,700,526 B2 | 3/2004 | Witten | |
| 6,710,741 B2 | 3/2004 | Tucker | |
| 6,717,392 B2 | 4/2004 | Pearson | |
| 6,723,375 B2 | 4/2004 | Zeck et al. | |
| 6,728,662 B2 | 4/2004 | Frost et al. | |
| 6,751,552 B1 | 6/2004 | Minelli | |
| 6,751,553 B2 | 6/2004 | Young | |
| 6,751,554 B1 | 6/2004 | Asher et al. | |
| 6,777,923 B2 | 8/2004 | Pearson | |
| 6,778,128 B2 | 8/2004 | Tucker et al. | |
| 6,798,379 B2 | 9/2004 | Tucker et al. | |
| 6,799,116 B2 | 9/2004 | Robbins | |
| 6,815,953 B1 | 11/2004 | Bigelow | |
| 6,819,109 B2 | 11/2004 | Sowers et al. | |

(56) References Cited

U.S. PATENT DOCUMENTS

| | | | |
|---|---|---|---|
| 6,825,775 B2 | 11/2004 | Fling et al. |
| 6,825,793 B2 | 11/2004 | Taylor, Jr. et al. |
| 6,833,795 B1 | 12/2004 | Johnson et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,853,905 B2 | 2/2005 | Barton |
| 6,865,484 B2 | 3/2005 | Miyasaka et al. |
| 6,895,356 B2 | 5/2005 | Brimhall |
| 6,898,525 B1 | 5/2005 | Minelli |
| 6,898,550 B1 | 5/2005 | Blackadar et al. |
| 6,904,361 B1 | 6/2005 | Tallman et al. |
| 6,941,890 B1 | 9/2005 | Cristo et al. |
| 6,947,028 B2 | 9/2005 | Shkolnikov |
| 6,954,071 B2 | 10/2005 | Flatt et al. |
| 6,956,524 B2 | 10/2005 | Tucker et al. |
| 6,956,564 B1 | 10/2005 | Williams |
| 6,958,690 B1 | 10/2005 | Asher et al. |
| 6,968,296 B2 | 11/2005 | Royle |
| 6,972,698 B2 | 12/2005 | Deguchi |
| 6,975,942 B2 | 12/2005 | Young et al. |
| 6,977,508 B2 | 12/2005 | Pearson et al. |
| 6,992,584 B2 | 1/2006 | Dooley et al. |
| 6,993,088 B2 | 1/2006 | Fling et al. |
| 6,999,021 B2 | 2/2006 | Taylor, Jr. |
| 7,003,138 B2 | 2/2006 | Wilson |
| 7,009,399 B2 * | 3/2006 | Olsson et al. ............... 324/326 |
| 7,009,519 B2 | 3/2006 | Leonard et al. |
| 7,038,454 B2 | 5/2006 | Gard et al. |
| 7,042,358 B2 | 5/2006 | Moore |
| 7,048,320 B2 | 5/2006 | Rubel |
| 7,053,789 B2 | 5/2006 | Fling et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,091,872 B1 | 8/2006 | Bigelow et al. |
| 7,113,124 B2 | 9/2006 | Waite |
| 7,116,244 B2 | 10/2006 | Fling et al. |
| 7,120,564 B2 | 10/2006 | Pacey |
| 7,142,196 B1 | 11/2006 | Connor |
| 7,216,034 B2 | 5/2007 | Vitikainen |
| 7,235,980 B2 | 6/2007 | Pearson et al. |
| 7,285,958 B2 | 10/2007 | Overby et al. |
| 7,304,480 B1 | 12/2007 | Pearson |
| 7,310,584 B2 | 12/2007 | Royle |
| 7,319,387 B2 | 1/2008 | Willson et al. |
| 7,331,340 B2 | 2/2008 | Barney |
| 7,336,078 B1 | 2/2008 | Merewether et al. |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,358,738 B2 | 4/2008 | Overby et al. |
| 7,372,247 B1 | 5/2008 | Giusti et al. |
| 7,372,276 B2 | 5/2008 | Mulcahey |
| 7,396,177 B2 | 7/2008 | Lapstun et al. |
| 7,396,178 B2 | 7/2008 | Lapstun et al. |
| 7,400,976 B2 | 7/2008 | Young et al. |
| 7,403,012 B2 | 7/2008 | Worsley et al. |
| 7,413,363 B2 | 8/2008 | Lapstun et al. |
| 7,443,154 B1 | 10/2008 | Merewether et al. |
| 7,451,721 B1 | 11/2008 | Garza et al. |
| 7,482,973 B2 | 1/2009 | Tucker et al. |
| 7,500,583 B1 | 3/2009 | Cox |
| 7,532,127 B2 | 5/2009 | Holman et al. |
| 7,636,901 B2 | 12/2009 | Munson |
| 7,640,105 B2 | 12/2009 | Nielsen et al. |
| 7,664,530 B2 | 2/2010 | Skelton |
| 7,733,077 B1 | 6/2010 | Merewether et al. |
| 7,773,095 B1 | 8/2010 | Badrak et al. |
| 7,834,801 B2 | 11/2010 | Waite et al. |
| 7,834,806 B2 | 11/2010 | Tucker et al. |
| 7,889,888 B2 | 2/2011 | Deardorr |
| 7,929,981 B2 | 4/2011 | Sangberg |
| 7,978,129 B2 | 7/2011 | Sawyer et al. |
| 7,990,151 B2 | 8/2011 | Olsson et al. |
| 8,060,304 B2 | 11/2011 | Nielsen et al. |
| 8,081,112 B2 | 12/2011 | Tucker et al. |
| 8,106,660 B1 | 1/2012 | Merewether et al. |
| 8,118,192 B2 | 2/2012 | Daugherty |
| 8,144,245 B2 | 3/2012 | Vik |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,264,409 B2 * | 9/2012 | Miller ............................ 342/465 |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 2001/0029996 A1 | 10/2001 | Robinson |
| 2002/0035432 A1 | 3/2002 | Kubica et al. |
| 2002/0052755 A1 | 5/2002 | Whatley et al. |
| 2002/0053608 A1 | 5/2002 | Zeck et al. |
| 2002/0103625 A1 | 8/2002 | Card et al. |
| 2002/0115472 A1 | 8/2002 | Andress |
| 2002/0122000 A1 | 9/2002 | Bradley et al. |
| 2002/0130906 A1 | 9/2002 | Miyaki |
| 2003/0012411 A1 | 1/2003 | Sjostrom |
| 2003/0080897 A1 | 5/2003 | Tranchina |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184300 A1 | 10/2003 | Bigelow |
| 2003/0196585 A1 | 10/2003 | McDonald et al. |
| 2004/0006425 A1 | 1/2004 | Wood |
| 2004/0051368 A1 | 3/2004 | Caputo |
| 2004/0057795 A1 | 3/2004 | Mayfield et al. |
| 2004/0070535 A1 | 4/2004 | Olsson et al. |
| 2004/0124988 A1 | 7/2004 | Leonard et al. |
| 2004/0168358 A1 | 9/2004 | Stump |
| 2004/0203909 A1 | 10/2004 | Koster |
| 2004/0210370 A1 | 10/2004 | Gudat |
| 2004/0220731 A1 | 11/2004 | Tucker |
| 2004/0225444 A1 | 11/2004 | Young et al. |
| 2005/0023367 A1 | 2/2005 | Reighard |
| 2005/0033513 A1 | 2/2005 | Gasbarro |
| 2005/0034074 A1 | 2/2005 | Munson |
| 2005/0038825 A1 | 2/2005 | Tarabzouni |
| 2005/0040222 A1 | 2/2005 | Robinson |
| 2005/0054457 A1 | 3/2005 | Eyestone et al. |
| 2005/0055142 A1 | 3/2005 | Mcmurtry et al. |
| 2005/0057745 A1 | 3/2005 | Bontje |
| 2005/0150399 A1 | 7/2005 | Wiley |
| 2005/0156600 A1 | 7/2005 | Olsson |
| 2005/0192727 A1 | 9/2005 | Shostak et al. |
| 2005/0206562 A1 | 9/2005 | Willson et al. |
| 2005/0232475 A1 | 10/2005 | Floeder |
| 2005/0278371 A1 | 12/2005 | Funk et al. |
| 2006/0026020 A1 | 2/2006 | Waite et al. |
| 2006/0055584 A1 | 3/2006 | Waite et al. |
| 2006/0077095 A1 | 4/2006 | Tucker et al. |
| 2006/0085133 A1 | 4/2006 | Young |
| 2006/0085396 A1 | 4/2006 | Evans |
| 2006/0109131 A1 | 5/2006 | Sen |
| 2006/0161349 A1 | 7/2006 | Cross |
| 2006/0169776 A1 | 8/2006 | Hornbaker |
| 2006/0220955 A1 | 10/2006 | Hamilton |
| 2006/0244454 A1 | 11/2006 | Gard |
| 2006/0254820 A1 | 11/2006 | Gard et al. |

(56) References Cited

U.S. PATENT DOCUMENTS

| | | |
|---|---|---|
| 2006/0262963 A1 | 11/2006 | Navulur |
| 2006/0276198 A1 | 12/2006 | Michelon et al. |
| 2006/0276985 A1 | 12/2006 | Xu |
| 2006/0282191 A1 | 12/2006 | Gotfried |
| 2006/0282280 A1 | 12/2006 | Stotz et al. |
| 2006/0285913 A1 | 12/2006 | Koptis |
| 2006/0287900 A1 | 12/2006 | Fiore et al. |
| 2006/0289679 A1 | 12/2006 | Johnson et al. |
| 2007/0013379 A1 | 1/2007 | Staples et al. |
| 2007/0018632 A1 | 1/2007 | Royle |
| 2007/0031042 A1 | 2/2007 | Simental |
| 2007/0040558 A1 | 2/2007 | Overby et al. |
| 2007/0100496 A1 | 5/2007 | Forell |
| 2007/0143676 A1 | 6/2007 | Chen |
| 2007/0219722 A1 | 9/2007 | Sawyer |
| 2007/0223803 A1 | 9/2007 | Shindo |
| 2007/0268110 A1 | 11/2007 | Litte |
| 2007/0286021 A1 | 12/2007 | Hoenmans et al. |
| 2007/0288195 A1 | 12/2007 | Waite et al. |
| 2008/0010009 A1 | 1/2008 | Miyoshi |
| 2008/0013940 A1 | 1/2008 | Jung |
| 2008/0125942 A1 | 5/2008 | Tucker et al. |
| 2008/0180322 A1 | 7/2008 | Islam |
| 2008/0204322 A1* | 8/2008 | Oswald et al. ............... 342/465 |
| 2008/0208415 A1 | 8/2008 | Vik |
| 2008/0255795 A1 | 10/2008 | Shkolnikov |
| 2008/0310721 A1 | 12/2008 | Yang |
| 2009/0004410 A1 | 1/2009 | Thomson et al. |
| 2009/0013928 A1 | 1/2009 | Nielsen et al. |
| 2009/0063258 A1 | 3/2009 | Mueller et al. |
| 2009/0085568 A1 | 4/2009 | Cole |
| 2009/0109081 A1 | 4/2009 | Ryerson |
| 2009/0121933 A1 | 5/2009 | Tucker et al. |
| 2009/0171616 A1 | 7/2009 | Zhang et al. |
| 2009/0185858 A1 | 7/2009 | Malit |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202111 A1 | 8/2009 | Nielsen et al. |
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0272885 A1* | 10/2010 | Olsson et al. ............... 427/137 |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |

(56) References Cited

U.S. PATENT DOCUMENTS

| | | | |
|---|---|---|---|
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |

FOREIGN PATENT DOCUMENTS

| | | |
|---|---|---|
| CH | 695087 A5 | 12/2005 |
| EP | 0636393 | 2/1995 |
| EP | 1521331 | 4/2005 |
| EP | 1852365 | 11/2007 |
| EP | 1974638 | 10/2008 |
| GB | 2266863 | 11/1993 |
| JP | 7256169 | 10/1994 |
| JP | 7128061 | 5/1995 |
| JP | 8285601 | 11/1996 |
| JP | 10060865 | 3/1998 |
| JP | 2000501666 | 2/2000 |
| JP | 2002079167 | 3/2002 |
| WO | WO9112119 | 8/1991 |
| WO | WO9424584 | 10/1994 |
| WO | WO9516827 | 6/1995 |
| WO | WO9629572 | 9/1996 |
| WO | WO9854600 | 12/1998 |
| WO | WO9854601 | 12/1998 |
| WO | WO9900679 | 1/1999 |
| WO | WO0194016 | 12/2001 |
| WO | WO0228541 | 4/2002 |
| WO | WO2004100044 | 11/2004 |
| WO | WO2004102242 | 11/2004 |
| WO | WO2005052627 | 6/2005 |
| WO | WO2006015310 | 2/2006 |
| WO | WO2006136776 | 12/2006 |
| WO | WO2006136777 | 12/2006 |
| WO | WO2007067898 | 6/2007 |

OTHER PUBLICATIONS

U.S. Appl. No. 13/644,226, filed Oct. 3, 2012, Nielsen et al.
3M Dynatel, Brochure, 2006, 1-4.
3M Dynatel, Locating and Marking System, Brochure, 2007, 1-16.
Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.
Bernold, L.. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild02lPDF/b02059.pdf>. p4, col. 2, para 2.
Carey, B., "Tracking Shoes," Chicago Tribune Online Edition, Jan. 29, 2007, pp. 1-3, http://www.chicagotribune.com/services/site/premium/access-registered.intercept.
CGA, Common Ground Alliance, Best Practices, Version 1.0, Apr. 2003, 93 pages.
CGA, Common Ground, Study of One-Call Systems and Damage Prevention Best Practices, Aug. 1999, 262 pages.
ESRI Corporate Introduction, http://www.esri.com/library/brochures/pdfs/corporate-intro.pdf, printed on Dec. 9, 2009 (original publication date unknown).
European Search Report, Application No. 08743671.3, Nov. 16, 2011.
European Search Report, Application No. 08743673.9, Feb. 28, 2011.
Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2010/000389, Jun. 2, 2010.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.
International Search Report and Written Opinion, Application No. PCT/US2008/55796, Oct. 14, 2008.
International Search Report and Written Opinion, Application No. PCT/US2008/55798, Jul. 28, 2008.
International Search Report and Written Opinion, Application No. PCT/US2009/000859, Apr. 14, 2009.
International Search Report and Written Opinion, Application No. PCT/US2009/003957, Mar. 21, 2011.
International Search Report and Written Opinion, Application No. PCT/US2009/005299, Dec. 22, 2009.
International Search Report and Written Opinion, Application No. PCT/US2009/005348, Mar. 2, 2010.
International Search Report and Written Opinion, Application No. PCT/US2009/005359, Feb. 8, 2010.
International Search Report and Written Opinion, Application No. PCT/US2010/036029, Sep. 3, 2010.
International Search Report and Written Opinion, Application No. PCT/US2011/047807, Dec. 6, 2011.
Jung, H.G., Structure Analysis Based Parking Slot Marking Recognition for Semi-automatic Parking System, Springer-Verlag Berlin Heidelberg 2006, 10 pages.
Luczak, S., "Increasing Accuracy of Tilt Measurements," Engineering Mechanics, vol. 14, 2007, p. 143-154.
MALA Application Note—Using MALA GPR systems with GPS equipment, Printed Matter No. 2894, 5 pages, www.malags.se, printed Apr. 9, 2010 (original publication date unknown).
MALA Application Note—Visualizing GPR data in Google Earth using MALA GPS Mapper, Printed Matter No. 2896, 3 pages, www.malags.se, printed Apr. 9, 2010 (original publication date unknown).
Mala GPS Mapper—Processing, 1 page, http://www.malags.se/Downloads/Software/processing/MALA-GPS-Mapper.aspx, printed on Apr. 9, 2010 (original publication date unknown).
MALA GPS Mapper—Product Releases, Sep. 19, 2007, 1 page, http://www.malags.se/News-and-Events/Product-Releases/MALA-GPS-Mapper.aspx, printed Apr. 9, 2010.
MALA Object Mapper™- Processing, 1 page, http://www.malags.se/Downloads/Software/Processing/Object-Mapper.aspx, printed Apr. 9, 2010 (original publication date unknown).
New Mexico's Recommended Marking Guidelines for Underground Utilities, May 2006, 8 pages.
Notice of Allowance dated Jan. 8, 2013 from U.S. Appl. No. 12/797,243.
Notice of Allowance dated Jan. 24, 2012 from U.S. Appl. No. 12/363,951.
Notice of Allowance dated Mar. 9, 2012 from U.S. Appl. No. 12/236,688.
Notice of Allowance dated May 2, 2012 from U.S. Appl. No. 12/429,929.
Notice of Allowance dated Jul. 12, 2012 from U.S. Appl. No. 12/539,497.
Notice of Allowance dated Aug. 1, 2012 from U.S. Appl. No. 12/364,339.
Notice of Allowance dated Aug. 25, 2011 from U.S. Appl. No. 11/696,606.
Notice of Allowance dated Sep. 5, 2012 from U.S. Appl. No. 12/854,370.
Notice of Allowance dated Oct. 1, 2012 from U.S. Appl. No. 12/607,843.
Notice of Allowance dated Oct. 17, 2012 from U.S. Appl. No. 12/236,688.
Notice of Allowance dated Oct. 25, 2012 from U.S. Appl. No. 12/639,373.

(56) References Cited

OTHER PUBLICATIONS

Notice of Allowance dated Nov. 6, 2009 from U.S. Appl. No. 11/685,602.
Notice of Allowance dated Nov. 7, 2012 from U.S. Appl. No. 12/639,041.
Notice of Allowance dated Dec. 12, 2012 from U.S. Appl. No. 12/703,958.
Notice of Allowance dated Dec. 21, 2012 from U.S. Appl. No. 12/364,339.
Notice of Allowance dated Apr. 28, 2011 from U.S. Appl. No. 29/356,631.
Notice of Allowance dated Jan. 25, 2012 from Canadian Application No. 2,710,189.
Notice of Allowance dated Nov. 12, 2010 from U.S. Application No. 29/356,633.
Notice of Allowance dated Nov. 12, 2010 from U.S. Application No. 29/356,634.
Notice of Allowance dated Nov. 12, 2010 from U.S. Application No. 29/356,635.
Notice of Allowance dated Nov. 28, 2011 from Canadian Application No. 2,710,269.
Office Action dated Jan. 9, 2013 from U.S. Appl. No. 12/571,411.
Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 20, 2012 from U.S. Appl. No. 12/764,164.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated May 1, 2012 from Australian Application No. 2009300362.
Office Action dated May 15, 2012 from U.S. Appl. No. 12/797,243.
Office Action dated May 17, 2012 from U.S. Appl. No. 12/364,369.
Office Action dated May 24, 2011 from U.S. Appl. No. 12/363,951.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 13, 2012 from U.S. Appl. No. 12/639,373.
Office Action dated Jun. 16, 2010 from Canadian Application No. 2,691,707.
Office Action dated Jun. 18, 2012 from U.S. Appl. No. 12/701,468.
Office Action dated Jun. 18, 2012 from U.S. Appl. No. 12/701,496.
Office Action dated Jul. 2, 2012 from U.S. Appl. No. 12/797,262.
Office Action dated Jul. 12, 2012 from U.S. Appl. No. 12/571,411.
Office Action dated Jul. 26, 2012 from U.S. Appl. No. 12/639,041.
Office Action dated Jul. 27, 2012 from European Application No. 08743671.3.
Office Action dated Aug. 15, 2012 from Australian Application No. 2010214104.
Office Action dated Aug. 29, 2012 from U.S. Appl. No. 12/701,447.
Office Action dated Sep. 4, 2012 from U.S. Appl. No. 12/622,768.
Office Action dated Sep. 21, 2012 from U.S. Appl. No. 12/797,202.
Office Action dated Sep. 25, 2012 from Australian Application No. 2010214053.
Office Action dated Sep. 26, 2011 from Canadian Application No. 2,739,119.
Office Action dated Sep. 26, 2011 from Canadian Application No. 2,739,320.
Office Action dated Oct. 2, 2012 from Japanese Application No. 2010-502170.
Office Action dated Oct. 4, 2011 from U.S. Appl. No. 12/364,359.
Office Action dated Oct. 15, 2012 from U.S. Appl. No. 12/797,227.
Office Action dated Oct. 19, 2012 from U.S. Appl. No. 12/797,243.
Office Action dated Oct. 20, 2011 from U.S. Appl. No. 12/639,041.
Office Action dated Oct. 24, 2011 from U.S. Appl. No. 12/236,688.
Office Action dated Nov. 9, 2011 from U.S. Appl. No. 12/429,929.
Office Action dated Nov. 14, 2012 from Canadian Application No. 2,750,908.
Office Action dated Nov. 15, 2011 from Canadian Application No. 2,691,707.
Office Action dated Nov. 18, 2009 from Canadian Application No. 2,623,466, filed Mar. 4, 2008.
Office Action dated Nov. 20, 2012 from U.S. Appl. No. 12/701,468.
Office Action dated Nov. 21, 2012 from U.S. Appl. No. 12/701,496.
Office Action dated Nov. 23, 2009 from Canadian Application No. 2,623,761, filed Mar. 4, 2008.
Office Action dated Nov. 23, 2009 from U.S. Appl. No. 12/855,977.
Office Action dated Nov. 26, 2012 from U.S. Appl. No. 12/764,164.
Office Action dated Dec. 5, 2012 from U.S. Appl. No. 12/797,262.
Office Action dated Dec. 18, 2012 from U.S. Appl. No. 12/786,929.
Office Action dated Dec. 20, 2012 from U.S. Appl. No. 12/571,408.
Office Action dated Dec. 28, 2012 from U.S. Appl. No. 12/364,359.
Office Action dated Dec. 30, 2011 from U.S. Appl. No. 12/701,447.
Office Action dated Apr. 28, 2009 from U.S. Appl. No. 11/685,602.
Office Action dated Jul. 20, 2010 from U.S. Appl. No. 11/696,606.
Office Action dated Sep. 17, 2009 from U.S. Appl. No. 11/685,602.
Office Action dated Jul. 11, 2011 from Canadian Application No. 2713282.
Office Action dated Jun. 28, 2011 from Canadian Application No. 2710269.
Office Action dated Mar. 19, 2012 from Canadian Application No. 2713282.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 2623761.
Office Action received Jan. 18, 2013 from Japanese Application No. 2009-553688.
Olsson, Office Action dated Sep. 13, 2012 from U.S. Appl. No. 12/827,993.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Trimble Navigation Limited, "H-Star Technology Explained," pp. 1-9, 2005, www.trimble.com.
Virginia Pilot Project, Incorporating GPS Technology to Enhance One-Call Damage Prevention, Phase I —Electronic White Lining Project Report, Nov. 2007, 50 pages.
Virginia Underground utility marking standard, Mar. 2004, 20 pages.
Nielsen et al., co-pending U.S. Patent No. 8,311,765, issued Nov. 13, 2012.
Nielsen et al., co-pending U.S. Publication No. 2010-0084532, published Apr. 8, 2010.
Nielsen et al., co-pending U.S. Publication No. 2010-0085694, published Apr. 8, 2010.
Nielsen et al., co-pending U.S. Publication No. 2010-0085701, published Apr. 8, 2010.
Nielsen et al., co-pending U.S. Publication No. 2010-0188407, published Jul. 29, 2010.
Nielsen et al., co-pending U.S. Publication No. 2010-0189887, published Jul. 2, 2010.
Nielsen et al., co-pending U.S. Publication No. 2010-0198663, published Aug. 5, 2010.

(56) References Cited

OTHER PUBLICATIONS

Nielsen et al., co-pending U.S. Publication No. 2010-0245086, published Sep. 30, 2010.

Nielsen et al., co-pending U.S. Publication No. 2010-0247754, published Sep. 30, 2010.

Nielsen et al., co-pending U.S. Publication No. 2010-0255182, published Oct. 7, 2010.

Nielsen et al., co-pending U.S. Publication No. 2010-0256825, published Oct. 7, 2010.

Nielsen et al., co-pending U.S. Publication No. 2010-0262470, published Oct. 14, 2010.

Nielsen et al., co-pending U.S. Publication No. 2010-0263591, published Oct. 21, 2010.

Nielsen et al., co-pending U.S. Publication No. 2010-0285211, published Nov. 11, 2010.

Nielsen et al., co-pending U.S. Publication No. 2011-0045175, published Feb. 24, 2011.

Nielsen et al., co-pending U.S. Publication No. 2011-0060549, published Mar. 10, 2011.

* cited by examiner

MARKING DEVICE WITH TRANSMITTER FOR TRIANGULATING LOCATION DURING LOCATE OPERATIONS

CROSS-REFERENCE TO RELATED APPLICATIONS

This application claims a priority benefit, under 35 U.S.C. §119(a), to Canadian application serial no. 2713282, entitled "Marking Device with Transmitter for Triangulating Location During Marking Operations," filed Aug. 13, 2010.

This application claims a priority benefit, under 35 U.S.C. §119(e), to U.S. Provisional Application Ser. No. 61/235,529, entitled "Marking Device With Active Radio Frequency Transmitter for Triangulating Location During Locate Operations," filed Aug. 20, 2009.

Each of the foregoing applications is incorporated by reference herein in its entirety.

BACKGROUND

Field service operations may be any operation in which companies dispatch technicians and/or other staff to perform certain activities, for example, installations, services and/or repairs. Field service operations may exist in various industries, examples of which include, but are limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 110 providing an excavation notice to a one-call center 120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection of "polygon maps" which indicate, within a given geographic area over which the one-call center has jurisdiction, generally where underground facilities may be found relative to some geographic reference frame or coordinate system.

Once facilities implicated by the locate request are identified by a one-call center, the one-call center generates a "locate request ticket" (also known as a "locate ticket," or simply a "ticket"). The locate request ticket essentially constitutes an instruction to inspect a work site and typically identifies the work site of the proposed excavation or design and includes a description of the dig area. The ticket typically lists all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner may contract with a locate service provider to receive locate request tickets and perform a locate and marking operation in response to received tickets on their behalf.

Upon receiving the locate ticket, a locate service provider or a facility owner (hereafter referred to as a "ticket recipient") may dispatch a locate technician 145 or 150 to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). An underground facility locate device is used to detect electromagnetic fields that are generated by a "test" signal provided along a length of a target facility to be identified. Locate devices typically include both a signal transmitter to provide the test signal (e.g., which is applied by the locate technician to a tracer wire disposed along a length of a facility), and a signal receiver which is generally a hand-held apparatus carried by the locate technician as the technician walks around the dig area to search for underground facilities. The signal receiver indicates a presence of a facility when it detects electromagnetic fields arising from the test signal. Conversely, the absence of a signal detected by the receiver of the locate device generally indicates the absence of the target facility.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 2A and 2B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 2A and 2B, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 2A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 2B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 2A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

Applicants have recognized and appreciated that uncertainties which may be attendant to locate and marking operations may be significantly reduced by collecting various information particularly relating to the marking operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location of where an underground facility was detected via a locate device during a locate operation.

More specifically, Applicants have recognized and appreciated that conventional techniques for using a locate device to detect underground facilities are sometimes tentative and typically iterative in nature, and use of locate devices with GPS capabilities may result in redundant, spurious and/or incomplete geographic location data collected by such devices. For example, during a typical locate operation, a technician attempting to locate an underground facility with a locate device often needs to sweep an appreciable area around a suspected underground facility, and make multiple passes with the locate device over the underground facility to obtain meaningful detection signals. Furthermore, the technician often needs to rely significantly on visual observations of the area, including relevant landmarks such as facility connections to buildings, transformer boxes, maintenance/public access points, curbs, sidewalks, roadways, etc., to effectively deduce a sensible path of an underground facility to be located. The foregoing is particularly true if at some point during the locate operation the technician loses a signal from an underground facility in the process of being detected (e.g., due to a broken transmitter circuit path from a damaged tracer wire, and loss of the transmitter test signal). In view of the foregoing, it may be readily appreciated that collecting and logging geographic location information throughout this process may result in excessive and/or imprecise data, or in some instances incomplete relevant data (e.g., in the case of signal loss/broken tracer wire), from which it may be difficult to cull the data that is truly complete and representative of where the underground facility ultimately was detected.

Furthermore, Applicants have recognized and appreciated that the location at which an underground facility ultimately is detected during a locate operation is not always where the technician physically marks the ground, pavement or other surface during a marking operation; in fact, technician imprecision or negligence, as well as various ground conditions and/or different operating conditions amongst different locate devices, may in some instances result in significant discrepancies between detected location and physical locate marks. Accordingly, having documentation (e.g., an electronic record) of where physical locate marks were actually dispensed (i.e., what an excavator encounters when arriving to a work site) is notably more relevant to the assessment of liability in the event of damage and/or injury than where an underground facility was detected prior to marking.

Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information. Applicants have recognized and appreciated that collecting information relating to both geographic location and color of dispensed marking material provides for automated correlation of geographic information for a locate mark to facility type (e.g., red=electric power lines and cables; blue=potable water; orange=telecommunication lines; yellow=gas, oil, steam); in contrast, in conventional locate devices equipped with GPS capabilities as discussed above, there is no apparent automated provision for readily linking GPS information for a detected facility to the type of facility detected. Applicants have further appreciated that building a more comprehensive electronic record of information relating to marking operations further facilitates ensuring the accuracy of such operations. Moreover, Applicants have appreciated that collecting data related to the motion of the marking device during a marking operation may provide various benefits.

In view of the foregoing, various inventive embodiments disclosed herein relate generally to a marking device forming part of a triangulation system for tracking the location of the marking device. The marking device may include a transmitter configured to transmit a wireless signal to multiple receiving components of the triangulation system. A receiver may perform a triangulation algorithm based on the transmitted signal. Thus, accurate tracking of marking device location during marking operations may be obtained without requiring the marking device to be equipped with a GPS system.

According to a first aspect of the invention, a marking device is provided to mark the presence or absence of an underground facility in a dig area. The marking device comprises a housing configured to enable dispensing of a marking material onto the ground for marking the presence or absence of an underground facility in a dig area; a marking dispenser holder affixed to the housing to hold a marking dispenser; an actuator to cause dispensing of the marking material from the marking dispenser onto the ground to mark the presence or absence of an underground facility in a dig area; and an RF transmitter configured to transmit an RF signal for location of the marking device.

According to a second aspect of the invention, a marking system comprises a marking device to mark the presence or absence of an underground facility in a dig area, the marking device including a housing, a marking dispenser holder affixed to the housing to hold a marking dispenser, an actuator to cause dispensing of a marking material from the marking dispenser onto the ground to mark the presence or absence of an underground facility in a dig area, and an RF transmitter configured to transmit an RF signal; two or more sensors positioned to receive the RF signal transmitted by the RF transmitter; and a computing device including a triangulation component to process the received RF signals and to determine therefrom location data representative of the location of the marking device relative to the two or more sensors.

According to a third aspect of the invention, a method is provided for performing a marking operation for marking the presence or absence of an underground facility in a dig area using a marking device that holds a marking dispenser. The method comprises dispensing a marking material from the marking dispenser onto the ground in the dig area to mark the presence or absence of an underground facility, in response to activation of the marking dispenser; transmitting an RF signal from the marking device; and determining, by a triangulation system, location data representative of a location of the marking device relative to the triangulation system, based on the transmitted RF signal.

In sum, one embodiment is directed to a system for tracking location of a marking device used to mark a presence or an absence of an underground facility during performance of a marking operation at a work site. The system comprises: the marking device comprising a transmitter configured to transmit a wireless signal; a first receiving system coupled to a vehicle at the work site, disposed at a first stationary location on the vehicle, and configured to receive the wireless signal and produce a first output signal; a second receiving system coupled to the vehicle, disposed at a second stationary location on the vehicle, and configured to receive the wireless signal and produce a second output signal; and at least one processor communicatively coupled to the first receiving system and the second receiving system to receive the first output signal and the second output signal and to execute a triangulation algorithm utilizing the first output signal and the second output signal.

Another embodiment is directed to a system for tracking location of a marking device used to mark a presence or an absence of an underground facility during performance of a marking operation at a work site. The system comprises the marking device, which in turn comprises: a tip configured to be disposed proximate ground when the marking device is in use; a marking material dispenser disposed proximate the tip of the marking device and configured to dispense a marking material; an actuator operable by a user of the marking device to dispense the marking material; a wireless transmitter disposed proximate the tip of the marking device and coupled to the actuator, wherein the transmitter is configured to, in response to actuation of the actuator, transmit a wireless signal including an identification of the marking device. The system further comprises a first receiving antenna coupled to a vehicle and disposed at a first stationary location of the work site and configured to receive the wireless signal and produce a first output signal, and a second receiving antenna coupled to the vehicle and disposed at a second stationary location of the work site and configured to receive the wireless signal and produce a second output signal. The system further comprises a global positioning system (GPS) receiver disposed at a third stationary location of the work site and configured to output a third output signal identifying the third stationary location, and at least one processor communicatively coupled to the first receiving antenna, the second receiving antenna, and the GPS receiver to receive the first output signal, the second output signal, and the third output signal, and configured to execute a triangulation algorithm utilizing the first output signal, the second output signal, and the third output signal to determine a location of the tip of the marking device.

Another embodiment is directed to a method of tracking a location of a marking device used to mark a presence or an absence of an underground facility during performance of a marking operation at a work site. The method comprises: transmitting a wireless transmission signal from the marking device to multiple receivers disposed at respective fixed locations at a vehicle at the work site, the multiple receivers forming at least part of a triangulation system; and triangulating, based on reception of the wireless transmission signal by the multiple receivers, the location of the marking device.

Another embodiment is directed to a marking device to mark a presence or an absence of an underground facility. The marking device comprises: a hand-held body; an actuator mechanically coupled to the hand-held body and configured to actuate a marking material dispenser to dispense marking material to mark the presence or the absence of the underground facility; and a first component of a triangulation system configured to transmit a wireless signal to at least one second component of the triangulation system disposed remotely from the marking device, the signal being indicative of a location of the marking device.

Another embodiment is directed to a method of tracking location of a marking device used to mark a presence or an absence of an underground facility during performance of a marking operation at a work site. The method comprises: transmitting, from the marking device to a receiving device disposed at the work site but remotely from the marking device, a wireless signal in a form usable by the remote device to determine a location of the marking device.

Another embodiment is directed to a system for tracking location of a marking device used to mark a presence or an absence of an underground facility during performance of a marking operation at a work site. The system comprises: the marking device comprising a transmitter configured to transmit a wireless signal; a first receiving antenna disposed at a first stationary location of the work site and configured to receive the wireless signal and produce a first output signal; a second receiving antenna disposed at a second stationary location of the work site and configured to receive the wireless signal and produce a second output signal; and at least one processor communicatively coupled to the first receiving antenna and the second receiving antenna to receive the first output signal and the second output signal and to execute a triangulation algorithm utilizing the first output signal and the second output signal.

Another embodiment is directed to a method of tracking a location of a marking device used to mark a presence or an absence of an underground facility during performance of a marking operation at a work site. The method comprises: triangulating the location of the marking device using a triangulation system at the work site.

Another embodiment is directed to a method of tracking a location of a marking device used to mark a presence or an absence of an underground facility during performance of a marking operation at a work site. The method comprises: receiving a wireless signal from the marking device at a receiving system disposed at the work site remotely from the marking device; and performing, with the receiving system, a triangulation algorithm utilizing the wireless signal.

Another embodiment is directed to a receiving system for tracking a location of a marking device used to mark a presence or an absence of an underground facility during performance of a marking operation at a work site. The receiving system comprises: a first receiving antenna disposed at a first stationary location and configured to receive a wireless signal from the marking device and produce a first output signal; a second receiving antenna disposed at a second stationary location, the second stationary location having a known relation to the first stationary location, the second receiving antenna configured to receive the wireless signal from the marking device and produce a second output signal; and at least one processor communicatively coupled to the first receiving antenna and the second receiving antenna to receive the first output signal and the second output signal and to execute a triangulation algorithm utilizing the first output signal and the second output signal and the known relation of the second stationary location to the first stationary location.

Another embodiment is directed to a method of performing a marking operation to mark a presence or an absence of an underground facility. The method comprises: arriving at a work site at which the marking operation is to be performed; positioning first and second receiving antennae at first and second locations; and operating the marking device to transmit a wireless signal from the marking device to the first and second receiving antennae.

Another embodiment is directed to a marking device to mark a presence or an absence of an underground facility. The marking device comprises: a hand-held body; an actuator mechanically coupled to the hand-held body and configured to actuate a marking material dispenser to dispense marking material to mark the presence or the absence of the underground facility; and a transmitter configured to transmit a signal to facilitate tracking of a location of the marking device.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, data related to motion of the marking device, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. published applications and patents are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2008-0228294-A1, published Sep. 18, 2008, filed Mar. 13, 2007, and entitled "Marking System and Method With Location and/or Time Tracking;" and U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method."

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The present disclosure, both as to its organization and manner of operation, together with further objectives and advantages, may be best understood by reference to the following description, taken in connection with the accompanying drawings as set forth below.

DETAILED DESCRIPTION

There are many reasons for which it may be desirable to know the location of a marking device during performance of a marking operation. These include, among other things, tracking the movements of the technician using the marking device and determining the location of locate marks formed by the technician, both of which may be determined or at least approximated by tracking the location of the marking device. According to various aspects of the present invention, the location of the marking device may be tracked by triangulating the location using signals transmitted by the marking device to suitable receivers. A triangulation system may be constructed at a work site at which a marking operation is to be performed, and the marking device to be used by the technician may include a suitable transmitter for transmitting the signals to be used by the triangulation system. According to one aspect, the triangulation system may further include a location tracking system, such as a GPS receiver, positioned in known relation to the receivers of the triangulation system to provide a known location to which the location of the marking device may be referenced.

As used herein, the term "triangulation" refers to any trigonometric operation for finding a position or location by means of bearings from two or more fixed points a known distance (or distances) apart, whether that operation involves the determination of angles (e.g., angle-of-arrival (AoA)), distances (commonly referred to as "trilateration"), some combination of the two, or any other suitable parameters. Thus, the term "triangulation" as used herein is intended to encompass trilateration, with trilateration representing one form of triangulation. The term "terrestrial triangulation" as used herein refers to triangulation in which the two or more fixed points are land-based, in contrast to, for example, systems utilizing satellites (e.g., GPS systems).

Following below are more detailed descriptions of various concepts related to, and embodiments of, inventive systems, methods and apparatus for determining location of a marking device by triangulation during locate operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
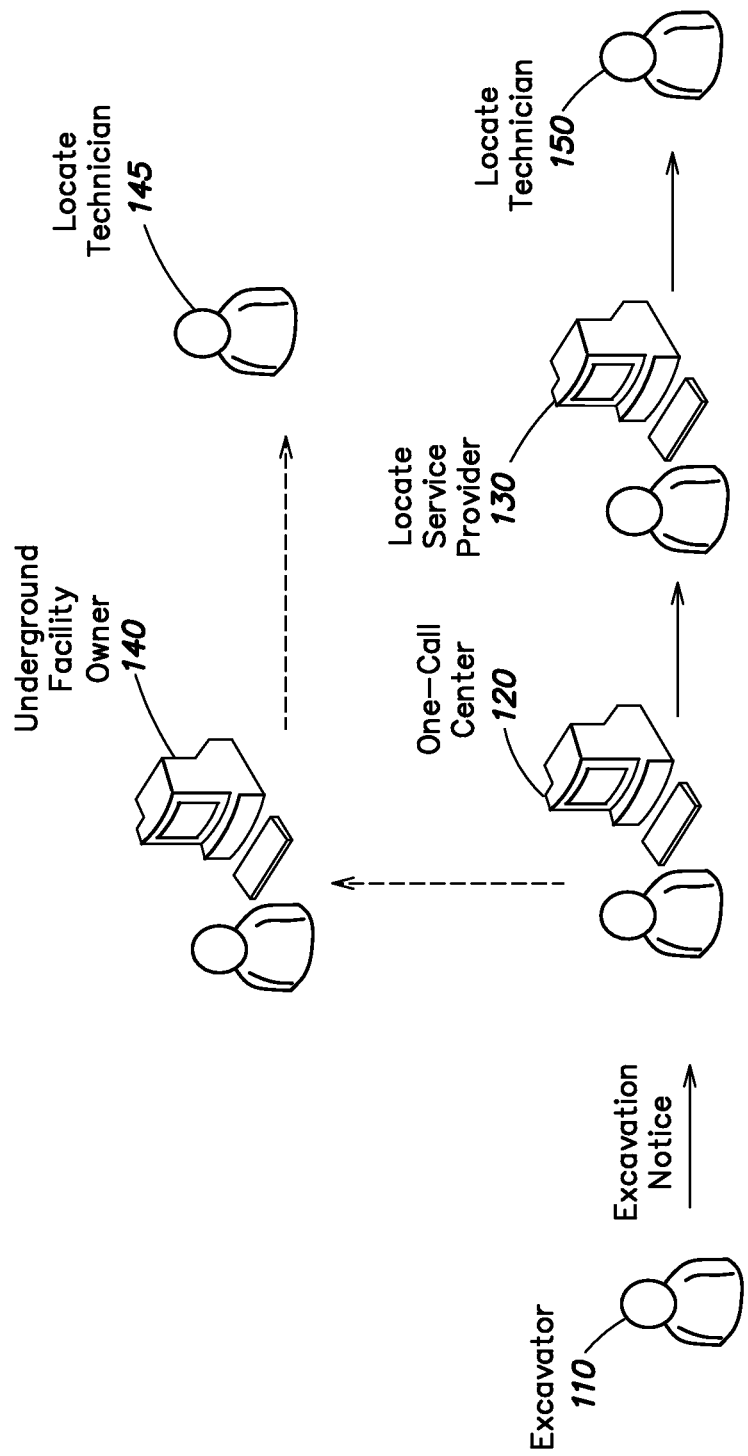
FIG. 1 is a schematic diagram that illustrates a process for initiation of a locate operation.
Figure 2:
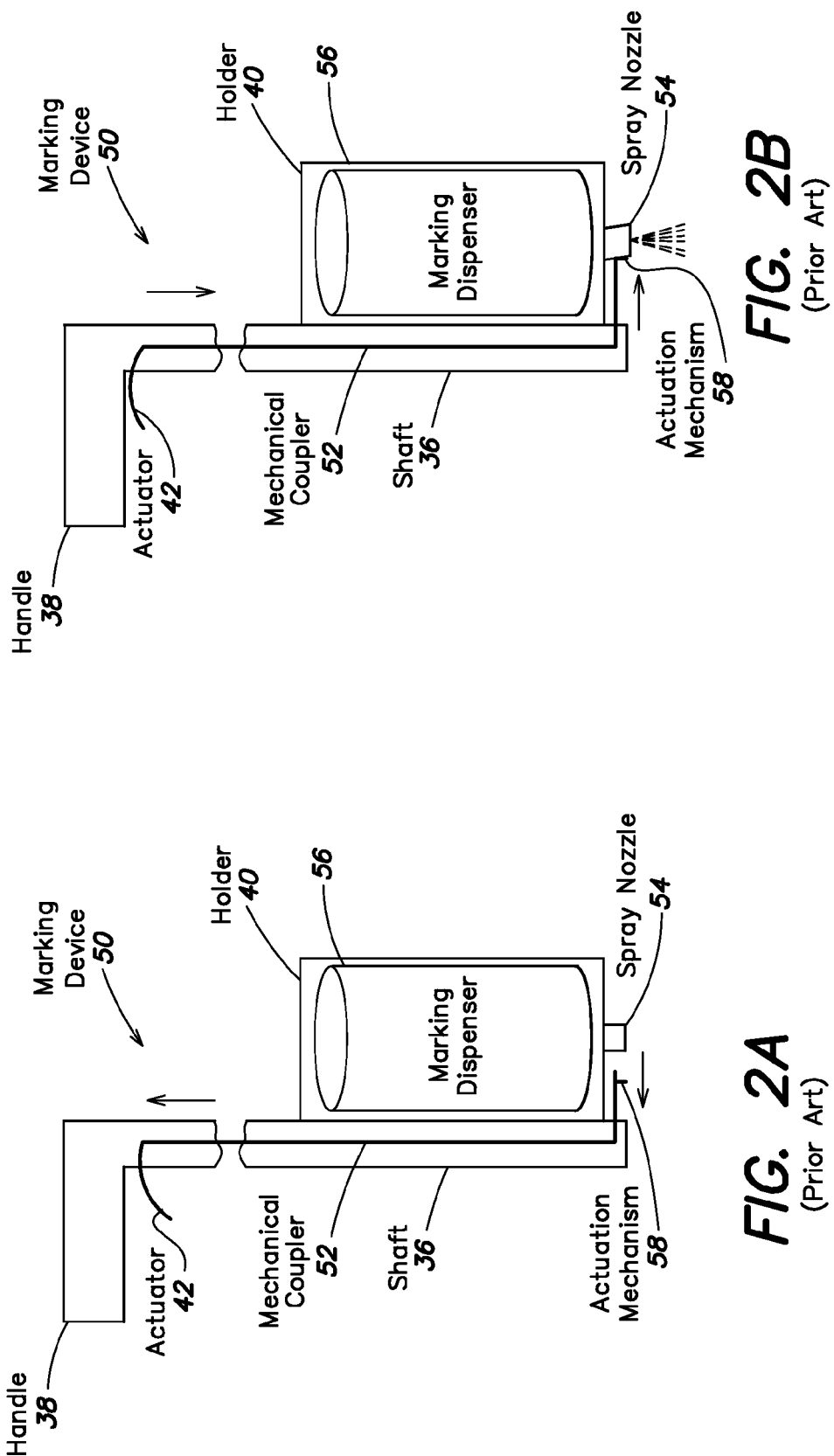
FIGS. 2A and 2B illustrate a conventional marking device with a mechanical actuation system to dispense paint as a marker.
Figure 3:
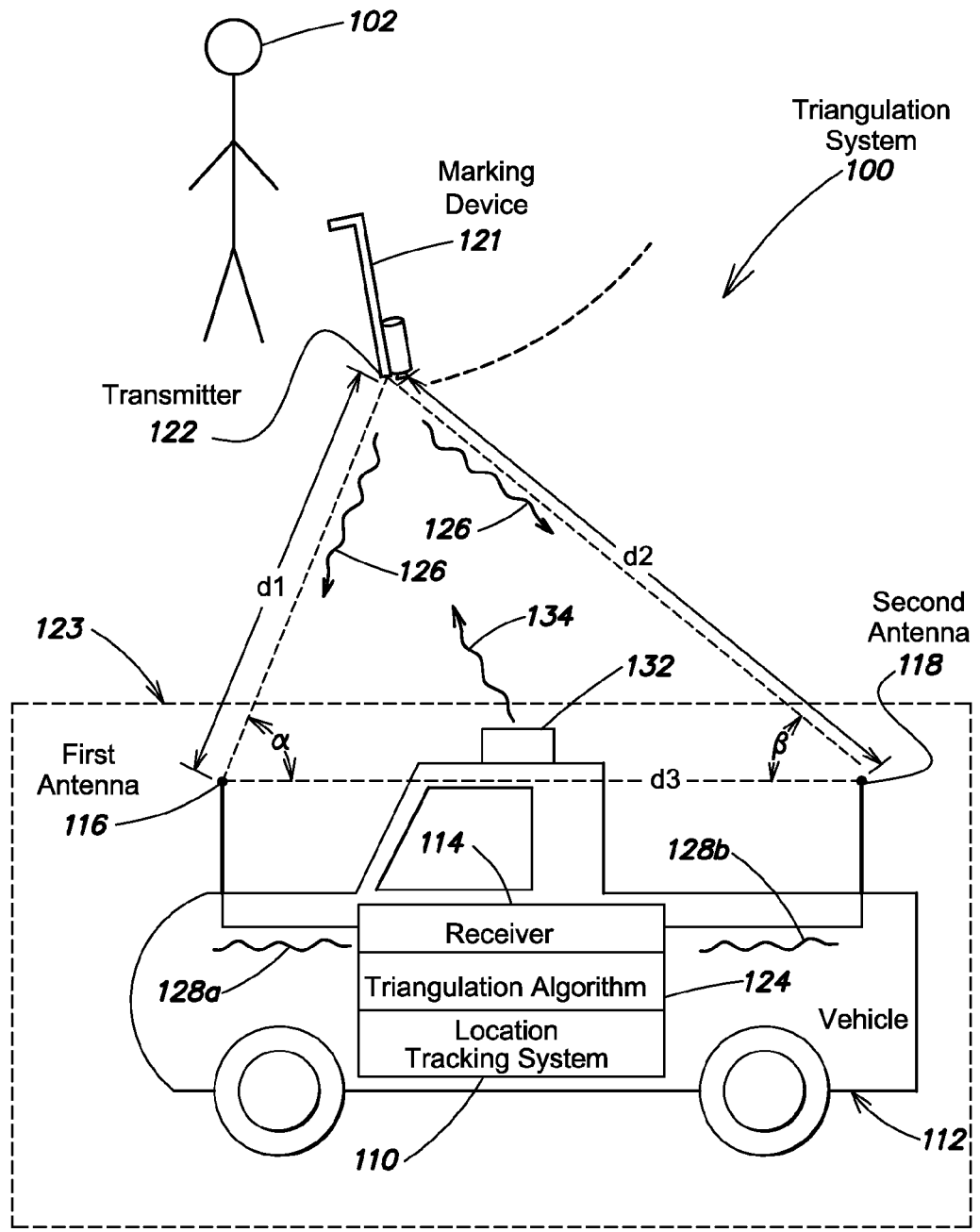
FIG. 3 illustrates a triangulation system that includes a marking device including a transmitter, according to the present disclosure.

As mentioned, in some instances it may be desirable to track the location of a marking device during performance of a marking operation. For example, doing so may provide information about movement of the technician using the marking device and the manner in which the marking device is being moved (e.g., whether the marking device is quickly changing locations, changing locations at a suitable rate, etc.), among other things. Thus, according to one aspect of the present invention, a triangulation system is constructed at a work site at which a marking operation is to be performed to track the location of the marking device. The marking device may include a transmitter to transmit a signal to two or more receiving components of the triangulation system located at different locations, and therefore may itself form a component of the triangulation system. The two or more receiving components may be positioned in a known relation relative to each other (e.g., a known distance and/or direction relative to each other). Upon receipt of the signal by the receiving components, a triangulation algorithm may be performed to determine the location of the marking device relative to the location of the receiving components. FIG. 3 illustrates a non-limiting example of a suitable triangulation system according to one non-limiting embodiment of this aspect.

As shown, the illustrated triangulation system 100 includes a locate technician 102 using a marking device 121 which includes a transmitter 122 configured to transmit a signal 126. The triangulation system also includes a receiver 114 coupled to a first antenna 116 and a second antenna 118. The first antenna and second antenna may each be at a fixed (stationary), known location and the relation (i.e., distance d3 and/or direction) between the two may be known. In the non-limiting embodiment illustrated, the receiver, first antenna and second antenna are on or in a vehicle 112 (e.g., a car, truck, or other vehicle), although it should be appreciated that not all embodiments are limited in this respect. For example, one or more of those components may be disposed at any suitable location of a work site, and not necessarily connected to a vehicle. For instance, one or more of those components may be disposed on a locate transmitter used in the locate operation, on a safety cone at the work site, on a telephone poll or other landmark, or at any other suitable location. As discussed further below, the triangulation system 100 may also optionally include a location tracking system 110 and a reader 132. As all the components of the triangulation system are land-based (e.g., located at the work site) the system represents a terrestrial triangulation system.

After receiving signal 126, the first antenna 116 and second antenna 118 may provide corresponding first and second output signals 128a and 128b, respectively, to the receiver 114. The first and second output signals may include, respectively, an indication of the time T1 at which the signal 126 was received by the first antenna 116 and the time T2 at which the signal 126 was received at the second antenna 118, which in some embodiments may be indicated simply by providing the signals 128a and 128b to the receiver 114 at the corresponding times. Thus, according to one embodiment, the first output signal 128a is provided to receiver 114 at a time corresponding substantially to the time at which signal 126 is received by the first antenna 116. Likewise, in such an embodiment, the second antenna 118 may provide the second output signal 128b to receiver 114 at a time substantially corresponding to the time at which signal 126 is received by the second antenna 118. In this manner, if the time T1 differs from the time T2, there will be a corresponding difference in time ΔT between when the receiver 114 receives the first output signal 128a and the time it receives the second output signal 128b. According to an alternative embodiment, the first output signal 128a and second output signal 128b may be provided to the receiver 114 at substantially the same time, but may include an indication of the respective times T1 and T2 so that, for example, the time difference ΔT may be determined.

In this non-limiting example, the determination of the location of the marking device 121 may be made by the receiver 114 using the first output signal 128a and the second output signal 128b as well as the known locations of the first and second antennae and/or known relation (e.g., distance d3) between the two. The receiver 114 may execute or perform a triangulation algorithm 124. Using the first and second output signals 128a and 128b, the algorithm may determine one or more of the following: the distance d1 between the marking device and the first antenna; the distance d2 between the marking device and the second antenna; the time difference ΔT between when the signal 126 is received by the first antenna (i.e., at time T1) and when the signal 126 is received by the second antenna (i.e., at time T2); the phase difference of the signal 126 when received by the first antenna compared to the second antenna, and the angles α and β, or any other suitable parameters. The algorithm may then use such information in combination with the known distance d3 between the first antenna and second antenna to determine the location of the marking device.

The triangulation algorithm may employ Angle-of-Arrival (AoA) calculations, Time-Difference-of-Arrival (TDoA) calculations, Received Signal Strength Indication (RSSI) calculations, any combination of those types of calculations, or any other suitable calculation(s), as the various aspects described herein relating to triangulation systems and algorithms are not limited to the types of calculations performed unless otherwise stated. A non-limiting example of triangulation processes that may be suitable for triangulation algorithm 124 may be the triangulation processes used by Ubisense Ltd (Denver, Colo.) (see www.ubisense.net). Systems and methods for determining the distance between two locations (e.g., the distance d3 between the first antenna and the second antenna) are described in U.S. Pat. No. 6,067,039, which is hereby incorporated by reference, although various alternatives exist.

In those embodiments in which the triangulating system includes two receiving antennae, as shown, the triangulation algorithm may, at one stage of processing, produce two possible locations for the marking device relative to the first and second receiving antennae (excluding out-of-plane possibilities which may be located the same distance from the receiving antennae as the two in-plane possibilities), and a decision between the two possibilities may be made, in some instances by the algorithm. For example, one possible location determined by the triangulation algorithm may be on a first side of the vehicle 112 and the second possible location may be on the other side of the vehicle 112, such that choosing the correct one of the two may be made by, for example, choosing which side of the vehicle the marking device is on. Various information may be used to facilitate choosing between the two possibilities. For example, positioning the receiving antennae (e.g., on the vehicle 112 or otherwise) such that the work site, and therefore the expected location of the marking device, is on one side of the antennae array including the receiving antennae may facilitate the choice (e.g., positioning the first and second antennae on a side boundary of the work site may allow for assuming that the marking device will always be on, for example, the left side of the antennae array). Alternatively, utilizing one or more compass readings from the marking device may facilitate the choice. As an example, a particular direction of movement (as determined by a compass) may correspond with the marking device moving closer to or farther from one or both of the antennae, which may thus be used to choose from among two possible locations based on whether the previous locations were farther from or closer to the antennae. Alternatives are also possible.

By utilizing three or more receiving antennae in the triangulation system a single possible location may be returned, thus avoiding any decision between two possible locations. Thus, it should be appreciated that the various aspects described herein relating to the use of triangulation to determine the location of a marking device are not limited to the embodiment of FIG. 3 in which two receiving antennae are used, but rather may include embodiments in which three or more antennae are used.

While in this non-limiting example the receiver 114 is described as performing the triangulation algorithm, it should be appreciated that operation of the triangulation system 100 is not limited in this respect. For example, according to an alternative embodiment the receiver 114 conditions the first output signal 128a and second output signal 128b (e.g., performing filtering, amplification, analog-to-digital conversion, or any other desired processing) and provides them to a separate processing device (e.g., a computer) to perform the triangulation algorithm. Thus, variations on the configuration of FIG. 3 are possible.

In some scenarios it may be desirable to determine a geographical location of the marking device as opposed to simply a location with respect to the receiving antennae 116 and 118. According to one embodiment, this may be done by including an optional location tracking system 110 with the triangulation system 100. The location tracking system 110 may include any device that can determine its geographical location to a certain degree of accuracy. For example, location tracking system 110 may be a global positioning system (GPS) receiver or a global navigation satellite system (GNSS) receiver. A GPS receiver may provide, for example, any standard format data stream, such as a National Marine Electronics Association (NMEA) data stream. Additionally, location tracking system 110 may include an error correction component (not shown) for improving the accuracy of its geo-location data. In one example, the error correction component may be an algorithm for correcting any offsets (e.g., due to local disturbances in the atmosphere) in the geo-location data of the location tracking system 110.

As mentioned, the receiver 114 may determine the location of the marking device relative to the first and second antennae. The geographical location(s) of one or both of the first and second antennae may be determined by suitably positioning them with respect to the location tracking system 110 (e.g., upon initial setup of the triangulation system, as described further below in connection with FIGS. 7A and 7B). Thus, the geographical location of the marking device may be calculated in relation to the geo-location of location tracking system. For example, an output of the location tracking system may be used in the triangulation algorithm 124. In this way, the geo-location of the marking device 121 may be tracked with a certain degree of accuracy during locate operations using the triangulation algorithm.

According to one embodiment, the location tracking system may be disposed on the vehicle 112 together with the receiver 114, first antenna 116, and second antenna 118. In an alternative embodiment, the location tracking system 110 may be disposed remotely from any such vehicle, and may in fact be disposed remotely from first antenna 116, second antenna 118, and/or receiver 114, so long as there is a known relationship between the position of the location tracking system 110 and the first antenna 116 and/or second antenna 118.

Various components of the triangulation system 100 in combination may be considered to form a "receiving subsystem" or "receiving system" of the triangulation system. For example, as shown in FIG. 3, the first antenna, second antenna, receiver, and location tracking system may be thought of as a receiving system 123. However, it should be appreciated that such a designation is non-limiting, and that variations may be made while still considering some subsystem of the illustrated components to be a "receiving system."

The various components of triangulation system 100 may be implemented in any suitable manner. Thus, any suitable type of marking device with any suitable transmitter may be used. For purposes of illustration, FIGS. 4 and 5 provide a perspective view and a functional block diagram, respectively, of one suitable non-limiting implementation of the marking device 121.

Figure 4:
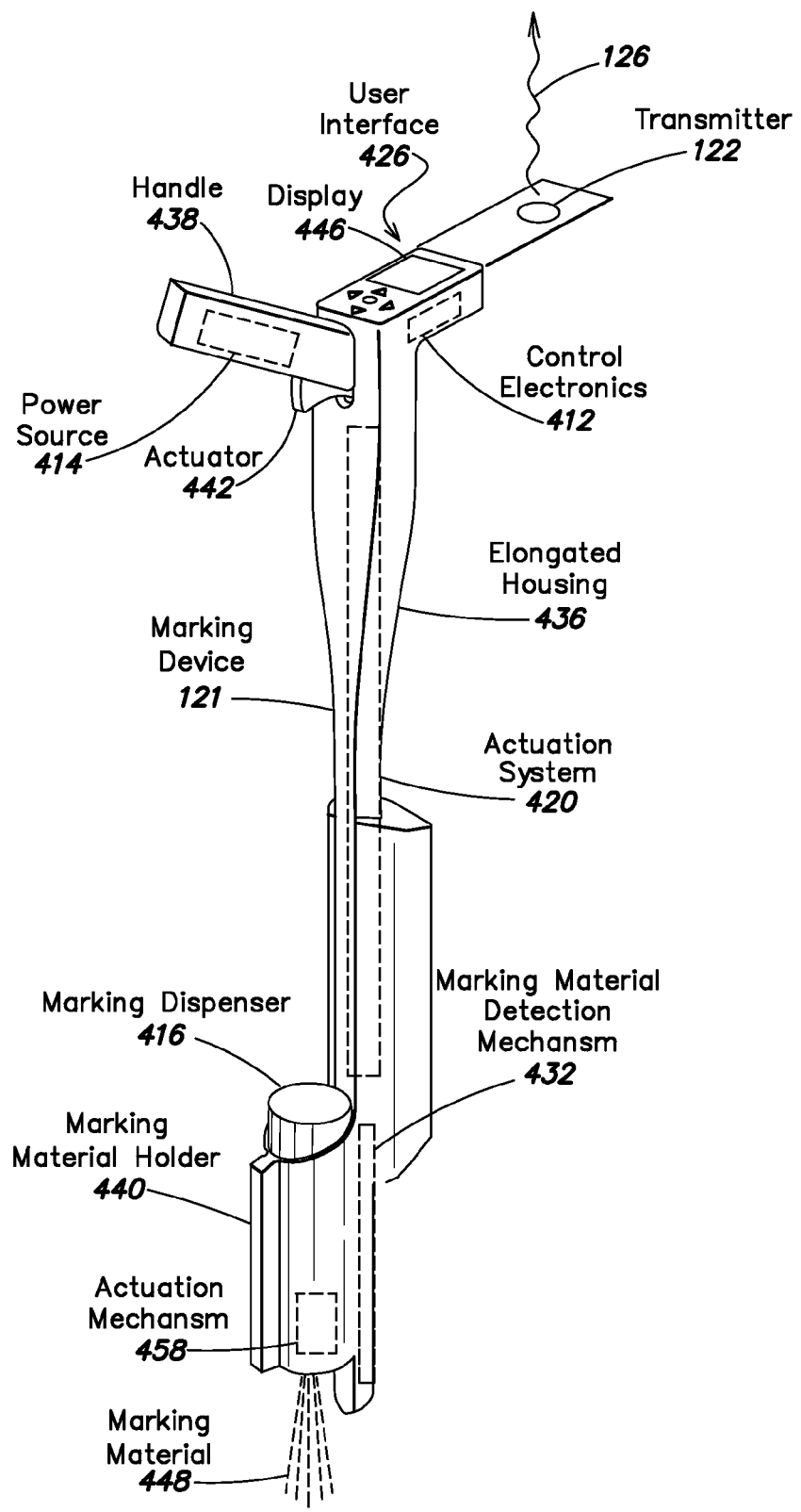
FIG. 4 illustrates a perspective view of a marking device including a transmitter to transmit a wireless signal, according to one non-limiting embodiment of the present invention.
Figure 5:
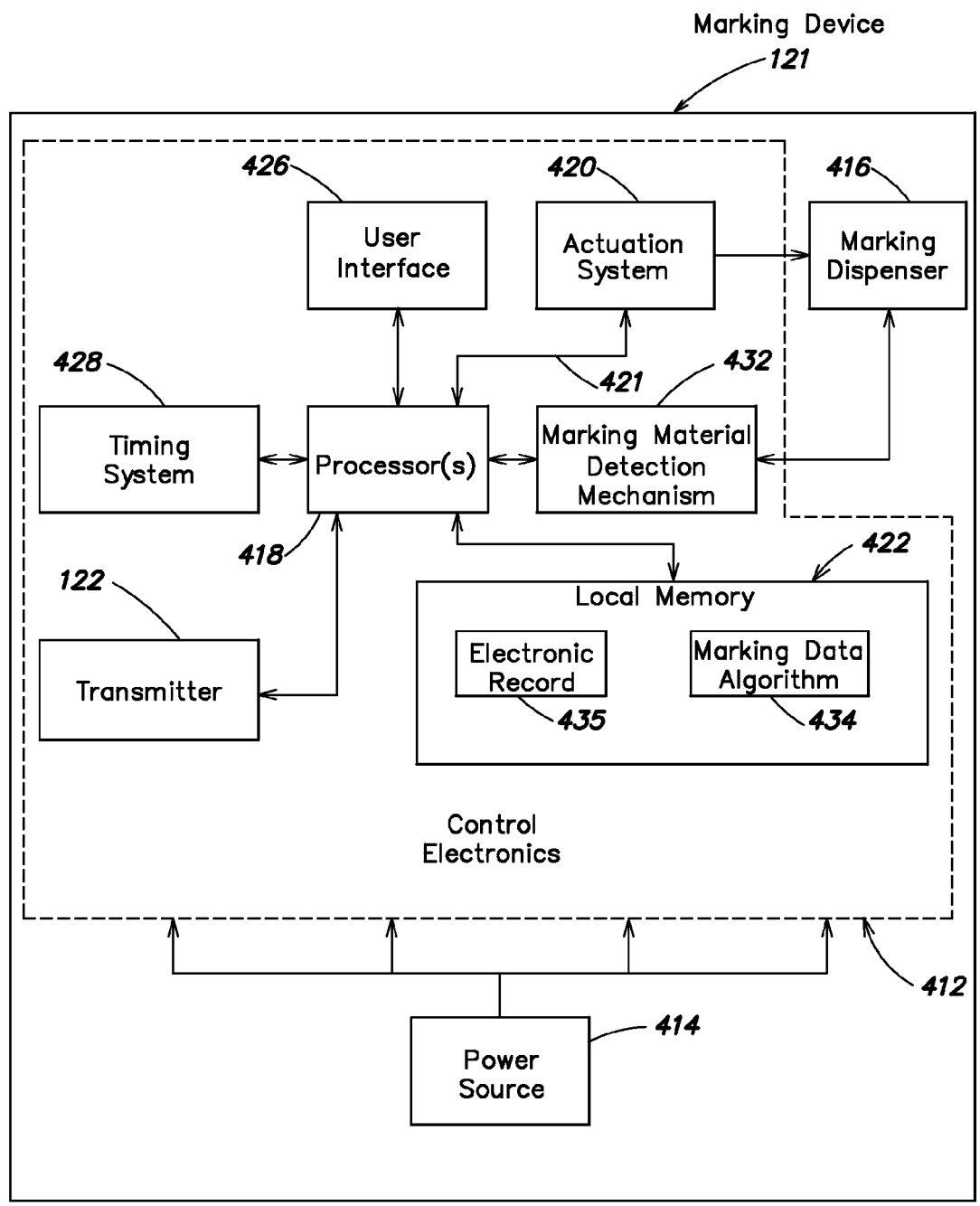
FIG. 5 illustrates a functional block diagram of the marking device of FIG. 4.

As shown, the illustrated non-limiting embodiment of marking device 121 shown in FIG. 4 includes an elongated housing 436 with a handle 438 at one end and a marking material holder 440 at an opposing end. A technician may hold the marking device by the handle so that, for example, the end of the elongated body including the marking material holder 440 is proximate the ground during use. The marking material holder 440 is configured to hold a marking dispenser 416, such as a paint can, which dispenses a marking material 448 upon being actuated by an actuation mechanism 458. The marking device 121 also includes an actuator 442 (e.g., a trigger, a pushbutton, or any other suitable actuator) which is coupled to the actuation mechanism 458 via an actuation system 420. The actuation system 420 may be electrical and/or mechanical in nature, and may respond to actuation of the actuator 442 (e.g., squeezing of the trigger in those embodiments in which the actuator 442 is a trigger) by controlling the actuation mechanism 458 to initiate dispensing of marking material 448 from the marking dispenser 416.

In addition, the marking device 121 includes the transmitter 122 which, in this non-limiting example, is positioned near the top of the marking device, close to the handle 438. Such positioning of the transmitter 122 may in some instances facilitate transmission of the signal 126 by reducing the likelihood of the signal encountering interference. During typical operation of the marking device, the end of the elongated housing 436 near the handle 438 may be approximately the highest point vertically of the marking device, with the opposing end (e.g., near the marking dispenser) being proximate the ground. Positioning the transmitter 122 as shown may reduce the likelihood of signal 126 experiencing interference or obstruction from objects near the ground.

The non-limiting embodiment of marking device 121 illustrated in FIG. 4 includes various additional components, which may be optional in some embodiments. For example, a power source 414 is provided in the handle 438 to power control electronics 412 as well as any other electronics of the marking device. The control electronics 412 may include those items illustrated in FIG. 5, as a non-limiting example, and in general may control the overall operation of the marking device. Referring to FIG. 5, the control electronics 412 may include at least one processor 418, which may be any suitable standard controller or microprocessor device that is capable of executing program instructions. The process 418 may interact with and control the various other components illustrated in FIGS. 4 and 5.

A user interface 426 may be provided allowing interaction between the technician and the marking device. The user interface may include, according to one embodiment, a display 446 as well as various input devices in the form of buttons, knobs, switches, or other similar input mechanisms. Thus, input to the marking device and output from the marking device may be provided via the user interface.

The control electronics may further include a timing system 428 which may be configured to record time in any suitable format. The timing system may have an internal clock (not shown), such as a crystal oscillator device. Additionally, timing system 428 may include a mechanism for registering time with a certain degree of accuracy (e.g., accuracy to the minute, second, or millisecond) and may also include a mechanism for registering the calendar date. In various implementations, the timing system 428 may be capable of registering the time and date using its internal clock, or alternatively timing system 428 may receive its time and date information from an external timing system, such as a remote computer or network. Timing information may include, but is not limited to, a period of time, timestamp information, date, and/or elapsed time. The processor 418 may use the timing information to group or correlate other information collected in association with operation of the marking device, such as information about operation of the transmitter, information input via the user interface, or information from the marking material detection mechanism 432, described below.

The marking material detection mechanism 432 may be any mechanism or mechanisms for determining a presence or absence of a marking dispenser 416 in or otherwise coupled to the marking device 121, as well as determining certain attributes/characteristics of the marking material within marking dispenser 416 when the dispenser is placed in or coupled to the marking device. For example, it may be desirable to know the type of marking material, color (if appropriate), manufacturer, and date of manufacture, among other things. In one embodiment, such information may be stored in an RFID tag on the marking dispenser. Accordingly, in one such embodiment the marking material detection mechanism 432 may be an RFID reader configured to read the RFID tag on the marking dispenser. In such embodiments, it may be preferable to place the marking material detection mechanism in close proximity to the marking dispenser, as shown in FIG. 4. However, other types and configurations of marking material detection mechanism are possible.

A local memory 422 may be provided, and may be any volatile or non-volatile data storage device, such as, but not limited to, a random access memory (RAM) device and a removable memory device (e.g., a universal serial bus (USB) flash drive, a multimedia card (MMC), a secure digital card (SD), a compact flash card (CF), etc.). The local memory may store a marking data algorithm 434, which may be a set of processor-executable instructions that when executed by the processor 418 causes the processor to control various other components of the marking device 121 to generate an electronic record 435 of a marking operation, which record also may be stored in the local memory 422 and/or transmitted in essentially real-time (as it is being generated) or after completion of a marking operation to a remote device (e.g., a remote computer). According to one embodiment, the electronic record 435 stores information provided by the timing system 428 and marking material detection mechanism 432, among other things. In some embodiments, the local memory 422 may store information to be included with the signal 126, such as an identification of the marking device or of the transmitter 122.

According to one embodiment, the processor 418 may play a role in actuation of the marking device. For example, the processor may send control signals to the actuation system 420 in response to actuation of the actuator 442 by a user. The actuation system 420 may also provide one or more output signals in the form of an actuation signal 421 to the processor 418 to indicate one or more actuations of the marking device. In response to such an actuation signal 421, the processor may acquire/collect various marking information and log data into the electronic record 435. Not all embodiments are limited in this respect, however. "Actuation" means starting or causing any device (e.g., marking device 121), program, system, and/or any combination thereof to work, operate, and/or function. Actuations of marking device 121 may be performed for any purpose such as, but not limited to, for dispensing marking material and for capturing any information of any component of marking device 121 without dispensing marking material.

Although not shown in FIGS. 4 and 5, additional input devices may be included as part of the marking device. For example, a temperature sensor, a humidity sensor, a light sensor, a compass, an inclinometer, and/or an accelerometer may be included, among other things. Such devices may operate in any suitable manner and may provide information stored in local memory 422 as being relevant to performance of a marking operation. Additionally or alternatively, information from the other input devices may be transmitted along with the signal 126 from the transmitter 122.

The signal 126 transmitted by the transmitter 122 may be of any suitable type and form, and therefore the transmitter 122 may be of any suitable type and configuration for transmitting such a signal. The various aspects of the invention described herein relating to transmission of a signal from a marking device for use in triangulating the position of the marking device are not limited in terms of the type of signal transmitted. According to one aspect of the present invention, the signal transmitted (e.g., signal 126) is a wireless signal. The marking technician may move throughout a work site while performing a marking operation, such that having a wired connection between the marking device and the receiving antennae is not practical. Thus, use of a wireless transmitter and therefore a wireless signal 126 may be preferable.

Various types of wireless signals exist, and the various aspects described herein utilizing transmission of a wireless signal from a marking device to one or more receiving devices (e.g., antennae) are not limited in the types of wireless signals. According to one embodiment, the wireless signal is a radio frequency (RF) signal. According to an alternative embodiment, the wireless signal is an acoustic signal, in which case the receiving systems may include acoustic transducers (e.g., microphones). Other types of wireless signals may also be used. The type chosen may depend on the desired characteristics of the signal in terms of, for example, the transmission qualities of the signal, such as the expected maximum transmission/propagation distance (range) needed, the signal strength desired, the likelihood of the signal experiencing interference from other wireless signals in the area (i.e., at the work site), the ruggedness of the corresponding type of transmitter for producing a particular type of signal, and the ability of the signal to store or be modulated with data (e.g., data from input devices of the marking device), among other possible characteristics of interest. In general, marking operations may have specifications associated therewith with respect to these signal characteristics. Thus, the type of signal 126 used may be chosen to meet any such specifications, and therefore it should be reiterated that various types of signals 126 may be suitable in various circumstances.

There may be an expected maximum signal propagation distance requirement for any given marking operation, which may correspond to the maximum expected distance of the marking device from the receiving antennae during the marking operation. That, in turn, may depend on the size and geometry of the work site. The type of transmitter 122 and corresponding type of signal 126 may be chosen in compliance with any such maximum expected propagation distance requirement. Thus, for example, if the maximum dimension of the work site is approximately 100 meters, the type of signal 126 and therefore the corresponding type of transmitter 122 may be selected to ensure that the signal 126 can travel such distances. According to one embodiment, the type of transmitter 122 is selected to ensure that the signal 126 is capable of traveling at least 30 meters. According to another embodiment, the signal 126 and corresponding transmitter 122 are selected to ensure that the signal can traverse a distance of up to approximately 100 meters, or in some embodiments up to approximately 200 meters. Other distances are also possible.

Another consideration in choosing the type of signal 126 to use is whether the signal will include any information with it. According to one embodiment, the signal 126 may include substantially no information, operating substantially as a beacon signal merely indicating the presence of the marking device. The transmitter may be thought of as a beacon in such instances. For example, in one embodiment the signal 126 may be an analog or digital signal with no information modulated thereon. According to one such embodiment, the signal 126 may be a sinusoidal signal. According to another such embodiment, the signal 126 may be a digital or analog pulse. In another such embodiment, the signal 126 may be a pulse train with substantially constant pulse amplitude and periodicity. In any such embodiments, the existence or non-existence of the signal (as determined by whether the receiving antennae receive a signal) may be all the information used by the triangulation system.

Alternatively, it may be desirable in some embodiments for signal 126 to include various information. For example, one piece of information which may be beneficial to include is an identification of the marking device. In this manner, the receiver may identify which marking device is sending the signal. This may be useful, for instance, in scenarios in which the signal 126 may be sent from multiple potential marking devices. For example, performance of some marking operations may involve utilizing multiple marking devices concurrently or simultaneously (for example if a work site is large and multiple technicians are working the job) and therefore it may be desirable to know which marking device transmitted a particular signal 126. In some embodiments, a desirable piece of information may be a technician identification. A technician may enter an ID when using a marking device and that ID may be transmitted with the signal 126 so that the technician may be known. Additionally, data from any input devices of the marking device may be included with signal 126 and captured by the receiver 114. For example, referring to FIG. 4, information generated by the marking material detection mechanism 432 may be included in signal 126. For instance, in some embodiments, information about the color of marking material, type of material and/or date of manufacture of the marking material may be determined by the marking material detection mechanism and transmitted with signal 126. Also, information from timing system 428 may be included in signal 126 in some embodiments, and may indicate when the signal 126 was transmitted. If the marking device includes any additional input devices (e.g., temperature sensors, humidity sensors, accelerometers, etc.), information from those may also be included in signal 126. In such embodiments, the type of transmitter 122 may be selected to be capable of including such information with the signal 126, for example by modulating such additional information on the signal 126. Accordingly, in such embodiments, the receiver 114 or any other suitable component of the triangulation system may have demodulation functionality to demodulate any information on signal 126.

In those embodiments in which the signal 126 includes information, the information may be included in any suitable manner. According to one embodiment, the information may be packetized and thus signal 126 may include one or more data packets. The packets may be of any suitable form, including any size (bit length), fixed or variable. According to one such embodiment, the packets may include a header and a payload. The header may include, for example, identification information identifying a marking device, a job site, a marking technician, a company or any other identification information of interest. The header may additionally or alternatively include any required header information for conforming to a particular communication protocol implemented by the marking device. The payload may include any of the other types of information described herein or any other suitable information. Other forms for packets are also possible, as this is a non-limiting example.

In view of the foregoing, it should be appreciated that transmitter 122 may be any suitable type of transmitter for generating a suitable signal 126. For example, the transmitter may be an RF transmitter or an acoustic transmitter, among other possibilities. The transmitter 122 may be an active transmitter, a passive transmitter, or a transceiver (i.e., a device capable of both receiving and transmitting signals). In the absence of any additional qualifier, the use herein of the term "transmitter" is intended to cover all of these scenarios (i.e., active, passive, or transceiver).

According to one embodiment, the transmitter 122 is an active transmitter. Thus, the transmitter 122 may generate and transmit signal 126 without the need to be prompted to do so by an external device. In such situations, the transmitter 122 may include a power source, or may otherwise be connected to a power source of the marking device (e.g., power source 414 in FIG. 4). In some situations, active transmitters may be capable of transmitting stronger signals 126 than would be possible with certain types of passive transmitters, such that use of an active transmitter may be preferred in some embodiments (e.g., in those embodiments in which the distance which signal 126 needs to cover to the receiving antennae is considerable).

In one embodiment, the transmitter 122 is an active radio frequency identification (RFID) tag or other active RF transmitter. Active RFID tags contain a battery and can transmit signals autonomously. By contrast, passive RFID tags have no battery and require an external source to provoke signal transmission. The transmitter may include a power source in some such embodiments, and may store an identification of the marking device or of the tag itself in some embodiments. Thus, the corresponding signal 126 may include the identification of the marking device and/or the RFID tag itself. The active RFID tag may generate a signal 126 at any suitable intervals, as the various aspects described herein are not limited in this respect.

In one example, the transmitter 122 may be an ultra-wide band (UWB) active RFID tag, which transmits UWB (i.e., 6 GHz-8 GHz) radio signals. An example of UWB active RFID technology is that supplied by Ubisense Ltd (Denver, Colo.) (see www.ubisense.net). When the transmitter 122 is a UWB active RFID tag, receiver 114 may be a UWB RF receiver. Using RF receiver 114 that is connected to first antenna 116 and second antenna 118 at vehicle 112, the location of transmitter 122 when it is a UWB active RFID tag may be known to within certain accuracy, such as an accuracy of about ±15 cm. Another example of a suitable active RFID tag is that provided by ActiveWave, Incorporated of Boca Raton, Fla. (http://www.activewaveinc.com/), providing a read range of up to 85 meters.

According to an alternative embodiment, the transmitter 122 is a passive transmitter. In such embodiments, the transmitter 122 may not include its own power source, but rather may receive power from an externally generated signal and then generate its own signal or may simply reflect an incident signal (which, as used herein, may be considered transmitting a signal). In those situations in which power is received from an external source, the external source may be of any suitable type. In one embodiment, a passive transmitter may harvest power from ambient radio waves, though not all embodiments are limited in this respect. In some embodiments in which the transmitter is passive, the external signal may be generated by a read device or interrogation device which may be situated at any suitable location with respect to the work site. According to one embodiment, the read device or interrogation device may be configured at a position of the first antenna, the second antenna, or the receiver 114, among other options. According to one such embodiment, the transmitter 122 is a passive RFID tag. In such embodiments, the triangulation system 100 may further include an RFID reader (e.g., reader 132 in FIG. 3) configured to generate and transmit to the marking device an activation signal (alternatively referred to herein as an interrogation signal or a read signal) to prompt transmission of signal 126 by the transmitter 122. A non-limiting example is illustrated in FIG. 3 in the form of optional read device 132 and corresponding activation signal 134. In response to receiving the activation signal 134, the transmitter 122 may be activated and generate and transmit signal 126. In an alternative embodiment, the activation signal 134 may be sent from one or both of the antennae 116 and 118 and in such situations may be generated by any suitable signal generator. For example, receiver 114 may double as a receiver and as a signal transmitter in some instances to generate the activation signal 134. While an RFID reader is a non-limiting example of a reader, other types may be used. According to one embodiment, radar technology may be used to read a tag on the marking device, for instance using the technology developed by Spectra Research of Dayton, Ohio.

In another alternative embodiment, transmitter 122 may be a hybrid RFID tag. A hybrid RFID tag is an RFID tag that may be activated on demand via an external power source that may be turned off and on, such as a power source onsite of the locate operation that may be turned off and on. Alternative types of transmitters are also possible.

In those embodiments in which the transmitter is or includes an RFID tag, the tag may be a read only tag or a read/write tag, as those embodiments employing RFID tags are not limited in this respect. A read/write tag may be desirable in situations in which, for example, it is desirable to update information stored on the tag during a marking operation, or in situations in which an identification number stored on the tag is to be updated. Read/write RFID tags are available from several vendors, including ActiveWave, Incorporated, previously referenced. In those embodiments in which a read/write tag is used, any suitable information may be written to the tag, including information from any input devices of the marking device (e.g., temperature sensors, timing systems, etc.), information about the marking material (e.g., color, brand, or other characteristics), or any other information of interest.

While some examples of RFID tags have been provided above, others are possible. For example, Westminster Limited of the United Kingdom (http://www.wi-ltd.com/security/Anti_Theft_and_Intruder_Detection/RFID_Tracking/RFID-_Tags/Tags) provides RFID tag solutions which may be suitable in some marking operation scenarios, such as the W/L-TG100 Domino Tag and W/L-TG801 Small Asset Tag. The Elpas All Weather Asset Tracking Tag is another example which may be suitable in certain marking operation circumstances, providing a read range of up to 100 meters. It is available from Visonic Technologies of Bloomfield, Conn. (http://www.visonictech.com/). Spectra Research of Dayton, Ohio also provides RFID tag products which may be suitable for certain marking operation requirements (http://www.spectra-research.com/).

The time at which signal 126 is transmitted may conform to one or more of several possibilities. According to one embodiment, signal 126 may be transmitted at periodic intervals throughout performance of a marking operation. The periodic intervals may be every half second, every second, every two seconds, every five seconds, or any other suitable interval. In such embodiments, the interval may be selected to provide a desired spatial resolution. For example, it may be desirable to track the location of the marking device to within one meter, one-half meter, one-quarter meter, within eighteen inches, or any other interval of interest. Some state and local authorities have established guidelines relating to the accuracy of positioning of locate marks, such as requiring that marks be accurate to within approximately eighteen inches. Thus, in some embodiments the desired resolution may be chosen to comply with state and/or local regulations. The transmission rate of signal 126 may be selected to ensure that changes in location greater than the desired spatial resolution do not go undetected. For example, if it is anticipated that the marking device 121 may move at no more than, for example, two meters per second, at any point during the marking operation, and if the location of the marking device is desired to be tracked within a resolution of, for example, half a meter, then it may be sufficient for signal 126 to be transmitted four times every second. However, this is merely a non-limiting example, and it should be appreciated that various other periodicities of transmission are also possible.

According to some embodiments, signal 126 may be transmitted periodically throughout a marking operation, at intervals ranging from approximately one millisecond up to approximately two seconds. Still, other periodicities are possible. In some embodiments, signal 126 may be transmitted substantially continuously throughout a marking operation. According to an alternative embodiment, signal 126 may be transmitted in response to actuation of the actuator of the marking device. As will be described further below, such an operating scenario may be preferable in situations in which it is desirable to know the location of any dispensed marking material. In some embodiments, the signal 126 may be transmitted with one periodicity while the actuator is not actuated and with a different periodicity when the actuator of the marking device is actuated. For example, it may be desirable to track motion of the marking device throughout performance of a locate operation, but with greater specificity while marking material is being dispensed than at other times during the locate operation. Thus, the signal 126 may be transmitted at slower lower periodicity when the actuator is not actuated (and no marking material is dispensed) and at a faster periodicity when the actuator is actuator and marking material is being dispensed, thus tracking the location of the marking device with greater resolution at times at which marking material is being dispensed. Thus, the various aspects described herein are not limited to any particular timing scenario with respect to the timing of transmission of signal 126.

In those embodiments in which the transmitter 122 is a passive transmitter, such that an activation signal 134 is transmitted to the marking device, the timing of any such activation signal may follow any of the operating schemes described above with respect to transmission of signal 126 (e.g., periodically with any desired periodicity, substantially continuously, etc.).

Figure 6:
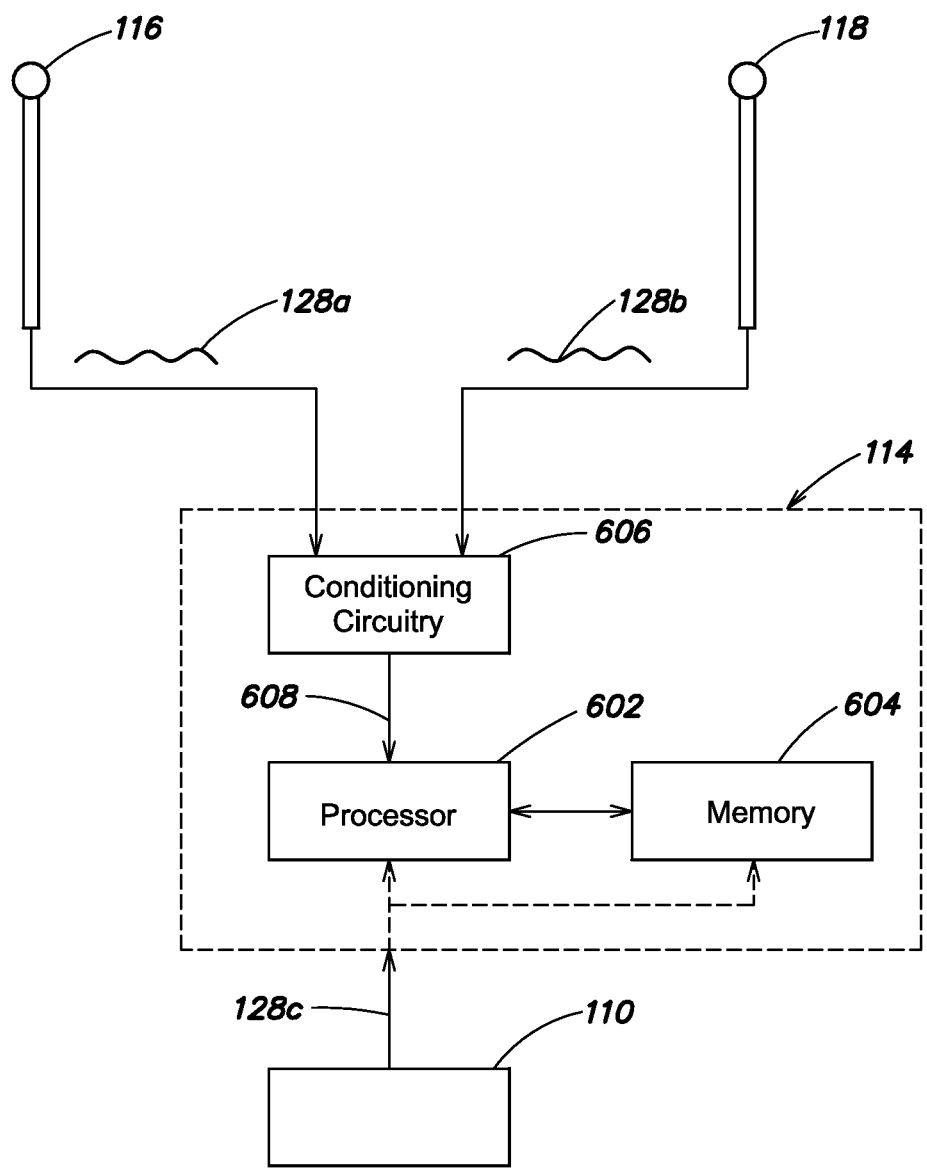
FIG. 6 illustrates a non-limiting example of a configuration of a receiving system of the triangulation system of FIG. 3.

FIG. 6 illustrates a non-limiting example of a suitable interconnection of the receiver 114, the first antenna 116, the second antenna 118, and the location tracking system 110 of triangulation system 100. As shown, the receiver 114 may include various components suitable for performing the functions previously described. In one embodiment, the receiver 114 includes at least one processor 602, memory 604, and conditioning circuitry 606. However, alternative configurations are also possible. The processor may be any suitable type of processor, including any of the types previously described with respect to processor 418. Similarly, the memory 604 may be any suitable type of memory and in some embodiments may be any of the types previously described with respect to local memory 422.

The antenna 116 and the antenna 118 are connected to the receiver to provide the first and second output signals 128a and 128b to the conditioning circuitry 606. The conditioning circuitry may include, e.g., filters, amplifiers, analog-to-digital converters, and/or any other circuitry suitable for putting the first output signal 128a and second output signal 128b in suitable form for the processor 602. The resulting output signals 608 of conditioning circuitry 606 are provided to the processor 602, which may perform the triangulation algorithm 124 previously described. In one embodiment, the triangulation algorithm is stored in memory 604 and provided to the processor 602 for execution. The result(s) of the triangulation algorithm may, in some embodiments, be stored in memory 604. In those embodiments in which the signal 126 is modulated with data, the processor 602 may demodulate the signal 608 to recover the data.

In addition to storing the triangulation algorithm in some embodiments, the memory 604 may store any pre-determined data useful in performing the triangulation algorithm. For example, as previously described, in some instances the location of one or both of the first antenna and second antenna may be known. The distance between the antennae may be known. Also, the relation between the location tracking system 110 (in those embodiments in which it is included) and the first and/or second antennae may be known. Any one or more of these types of information may be stored in memory 604, for example being programmed into the memory 604 after they are determined. Similarly, the relationship (e.g., distance, direction, etc.) between the location tracking system and the antennae may be stored in memory 604. As will be described with respect to FIG. 7, according to one non-limiting embodiment each of the components is positioned by a technician at positions of known location.

As shown, location tracking system 110 is connected to receiver 114 and configured to provide a third output signal 128c including an indication of the location of location tracking system 110. According to one embodiment, the third output signal 128c is provided directly to processor 602 (e.g., for use in the triangulation algorithm). According to an alternative embodiment, the third output signal 128c may be provided to memory 604. These two alternatives are illustrated by the dashed arrows in FIG. 6. Variations on these two possibilities also exist.

Figure 7A:
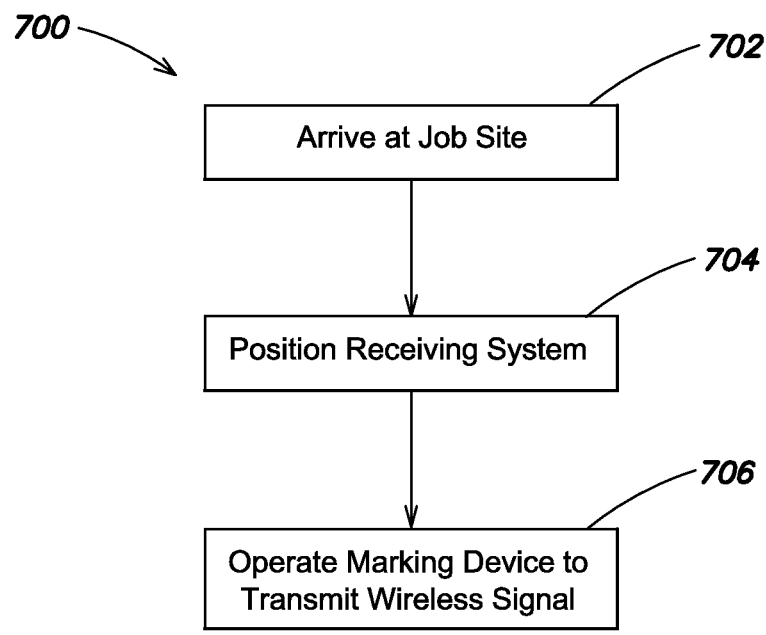
FIG. 7A is a flowchart of a method of performance of a marking operation in accordance with a non-limiting embodiment of the present invention.
Figure 7B:
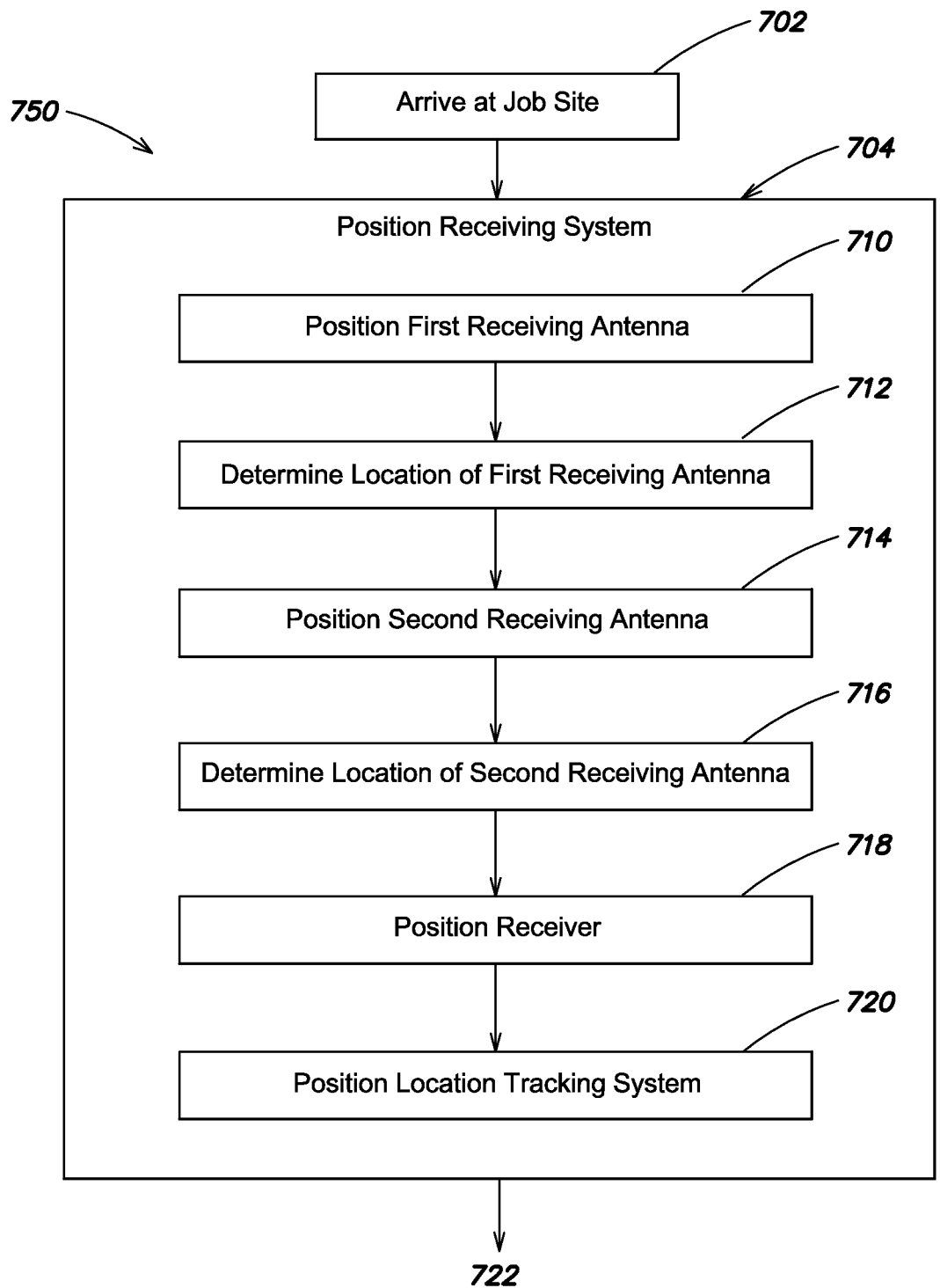
FIG. 7B illustrates a non-limiting example of a more detailed implementation of the method of FIG. 7A.
Figure 7B:
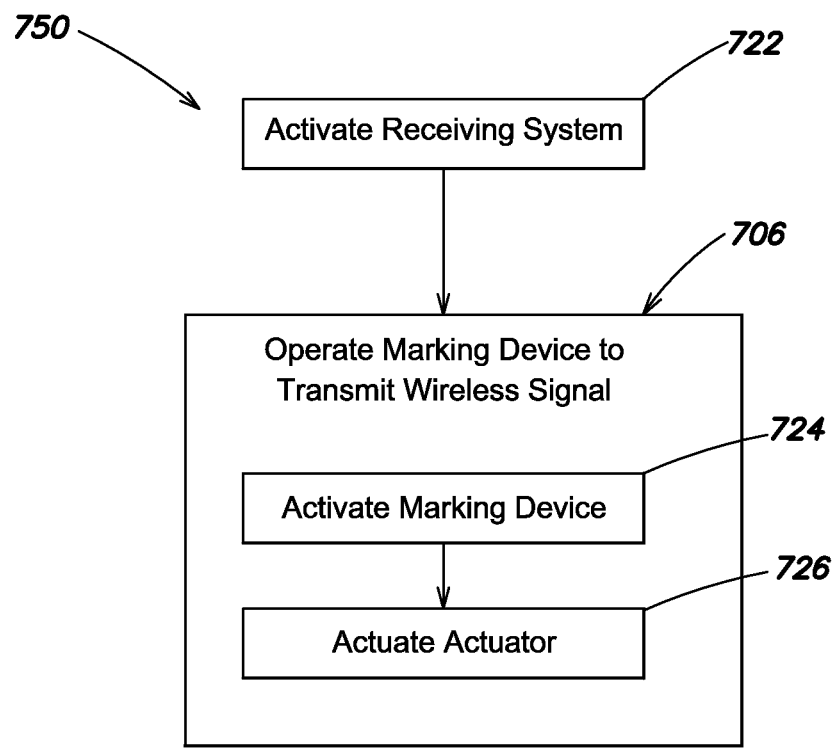

FIGS. 7A and 7B illustrate methods in which a technician may perform a marking operation to utilize triangulation for locating the marking device, according to aspects of the present invention. FIG. 7A is a flow chart of a first, more general method, while FIG. 7B illustrates a more detailed, non-limiting example.

As shown in FIG. 7A, the method 700 may comprise the technician arriving at the work site in step 702. In some instances, the technician may arrive at the work site in a vehicle, such as a truck (e.g., vehicle 112 of FIG. 3). However, not all embodiments are limited in this respect.

In step 704 the technician may position any needed components of a receiving system of a triangulation system. As previously described, a triangulation system may include, for example, receiving antennae, a receiver, a location tracking system, and/or a reader, among other things. Thus, the technician may set up such components as necessary. For example, referring to FIG. 3, the receiving system 123 of triangulation system 100 may include the receiver 114, first antenna 116, the second antenna 118, and the location tracking system 110 (if being used), and therefore in step 704 the technician may position one or more of those components as appropriate. In some instances, one or more of such components may be set up in a known relation to each other, for example being separated by known distances from each other. The technician may measure the distances between components in any suitable manner.

In some embodiments in which two receiving antennae are used in the triangulation system, it may be desirable to arrange them at the work site such that the marking device will be located on one side of them during the marking operation. Recalling the previous discussion of FIG. 3, use of the triangulation system 100 may result at one stage of processing in determining two possible locations of the marking device relative to the first and second antennae; one on a first side of the antenna array (the array being the combination of the two antennae) and a second on another side of the antenna array. As discussed, selection between the two possible locations may be based on, for example, knowledge about which side of the array the marking device is on or expected to be on during the marking operation. Such selection may be facilitated by positioning the antennae so that the marking operation is performed substantially or completely on one side of the array. For example, it may be desirable to position the first and second antennae along a boundary of the work site.

While step 704 has been described in the context of triangulation system 100, it should be appreciated that a suitable receiving system may include other components than those shown, and that not all of the components included may require positioning by the technician. For example, one or more of the receiving antennae may already be in place at a particular work site and thus not require positioning by the technician, e.g., if the receiving antenna was previously positioned as part of a previous marking operation or if the antenna serves an additional function for which it is permanently located at the work site. In addition, in some embodiments a suitable receiver 114 and/or location tracking system 110 may already be at a work site, such that a technician does not need to position it at the beginning of any given marking operation.

In step 706, the technician may operate the marking device (e.g., marking device 121) to transmit the wireless signal (e.g., signal 126). In some instances, operating the marking device may involve activating the marking device (i.e., turning the marking device on) and actuating the actuator of the marking device one or more times to transmit the wireless signal. However, it should be appreciated that not all embodiments are limited in this manner.

It should be appreciated that within each of the illustrated steps 702-706 of method 700, various alternatives are possible. For purposes of illustration, FIG. 7B provides a more detailed non-limiting example of technician performance of a marking operation.

As shown, the method 750 may comprise arriving at the work site in step 702, as previously described. Step 704, positioning the receiving system, may involve positioning multiple components in this non-limiting embodiment. In step 710 the first receiving antenna may be positioned and its location may be determined in step 712. For example, the technician may place the first receiving antenna at a particular location and then determine the GPS coordinates of the antenna by taking a GPS reading at that location using any suitable GPS receiver. In step 714 the technician may position the second receiving antenna and then in step 716 determine the location of the second receiving antenna, for example in the same manner in which the location of the first receiving antenna may be determined. Thus, in this non-limiting embodiment, the locations of the first receiving antenna and second receiving antenna are known as of step 716, and their relation to each other is known as well. As an alternative, steps 712 and 716 may be omitted and instead a distance between the first and second antennae may be measured after steps 710 and 714.

If the receiving system includes a receiver, such as receiver 114 of FIG. 3, the receiver may be positioned in step 718. If a location tracking system is to be used with the triangulation system, such as location tracking system 110 of FIG. 3, such system may be positioned at step 720. It should be reiterated that the ordering of steps 710 through 720 is not limiting and that various alternative orderings are possible. Furthermore, as explained above, this non-limiting embodiment is given with respect to a triangulation system that includes both first and second receiving antennae, a receiver, and a location tracking system. In the event that a receiving system does not include these components, one or more of the illustrated steps 704-720 may be altered or omitted accordingly. Or, in the scenario in which the receiving system includes more than two antennae, additional steps corresponding to the positioning of those additional antennae may be included.

After the receiving system (e.g., receiving system 123 of FIG. 3) is positioned in step 704, it may be activated in step 722. For example, one or more components of the receiving system may be turned on, such as the receiver 114 and location tracking system 110. In some embodiments, however, it may not be necessary to activate any of the components of the receiving system, for example if they are continuously in an activated state. Step 722 may further involve coupling components of the receiving system if needed. For example, cables, wires, or any other suitable connections between the components of the receiving system may be put into place if needed.

Step 706, in which the marking device is operated to transmit a wireless signal, may include in this non-limiting embodiment activating the marking device in step 724 (e.g., turning the marking device on) and actuating an actuator of the marking device in step 726. However, it should be appreciated that alternatives are possible. In fact, as previously described, not all embodiments described herein are limited to requiring actuation of an actuator of the marking device to generate a wireless signal to be transmitted from the marking device, and thus not all embodiments implement step 726.

It should be appreciated that one or more of the steps 710-720 may be performed at a single time. For example, referring to FIG. 3, in at least one embodiment of the present invention a receiving system includes a first antenna 116, a second antenna 118, the receiver 114, and a location tracking system 110 all disposed on the vehicle 112. Thus, the steps of positioning the first receiving antenna, the second receiving antenna, the receiver, and the location tracking system may be performed simply by positioning the vehicle 112 (e.g., parking the vehicle in a suitable location of the work site). Furthermore, although not illustrated in FIG. 7B, it should be appreciated that positioning the receiving system in step 704 may involve positioning the reader 132 if any such device is included in the triangulation system, as the reader may be considered part of the receiving system in some embodiments.

To this point, the configuration and operation of a triangulation system according to an aspect of the present invention has been described as providing a location of the marking device 121 generally. However, in some embodiments it may be desirable to know the location of a specific part of the marking device 121. For example, in some situations it may be desirable to know the location (e.g., geolocation) of any marking material dispensed by a marking device. Such information may not only be useful in terms of knowing where within a work site locate marks are formed, but may also be useful in knowing certain characteristics of formed locate marks, such as the size and/or shape. To facilitate this, it may be preferable to know the location of a point of the marking device near the point from which marking material is dispensed, rather than simply knowing the location of the marking device generally.

Figure 8:
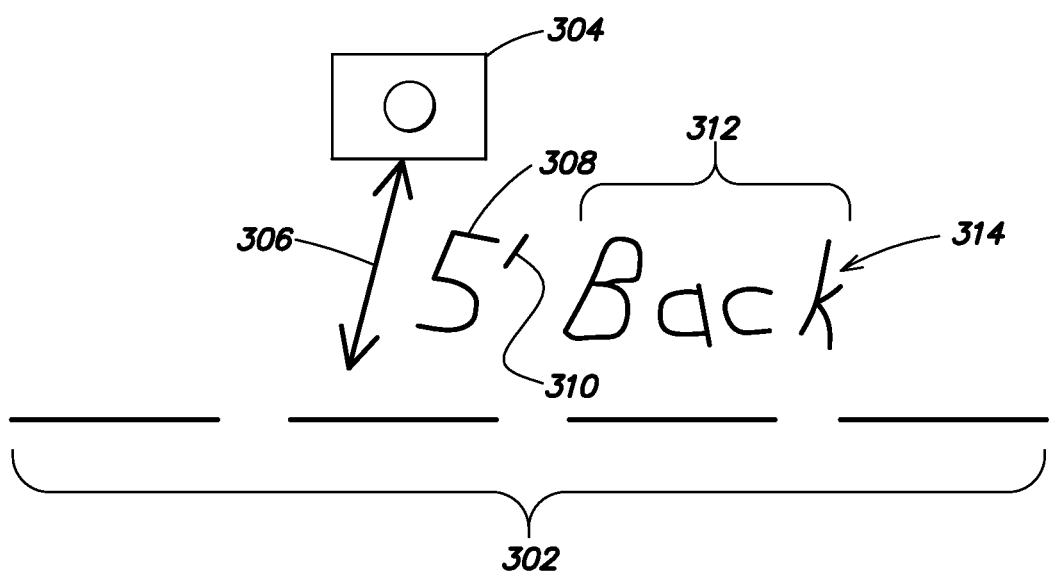
FIG. 8 illustrates a non-limiting example of the types of marks which may be made during a marking operation.

As background, various types of locate marks may be formed during a marking operation. The marking technician may paint dot patterns or lines patterns to mark the presence or absence of an underground facility. Additionally, the marking technician may form symbols, numbers, and/or letters/words. FIG. 8 provides a top view (i.e., a bird's eye view) of a non-limiting example of the types of locate marks that are commonly made on the ground or other surface during marking operations, although other kinds are also possible. Such marks may be made with any suitable type of marking material, including paint (e.g., from a spray paint can), chalk, dye and powder, among other possibilities.

The collection of marks illustrated in the non-limiting example of FIG. 8 may be formed in a situation in which a detected underground facility is located a certain distance from an easily identifiable landmark. In such situations, a marking technician may identify the location of the facility and may also include an indication (e.g., "directions") of where the facility is relative to the easily identifiable landmark, to aid others in finding the facility in the future. Thus, in the non-limiting example of FIG. 8, the locate marks include a lines pattern 302 (so called because it includes multiple lines) which indicates the location of an underground facility. A landmark (e.g., a telephone pole) 304 is located nearby to the underground facility. Thus, the marks also include an arrow 306, which is one example of a symbol that may be formed during the marking operation, pointing from the landmark to the lines pattern, as well as the text "5'

Back" (in the form of a number "5" 308, an apostrophe 310 (another example of a symbol), and the word 312 including letters 314) indicating that the facility is located five feet from the landmark in the direction of the arrow. Again, other locate marks may be formed in other scenarios, as those illustrated are merely examples. For instance, other symbols may include squares, triangles, and circles, among others. Different numbers, patterns (e.g., dotting patterns in addition to or instead of lines patterns), and words may also be marked.

It may be desirable to have a record of these types of markings or any other type of marking(s) made during the marking operation, including information such as the existence of such marks, the size of the marks, the shape of the marks, and the quality of the marks (e.g., whether the marks are made with uniform width, uniform height, whether they are smooth, etc.). Such information may be provided by tracking the motion of the marking device, and therefore by tracking the location of the marking device. In particular, in forming any given locate mark the marking material dispenser may be moved in a shape that corresponds to the shape of the resulting mark, and is typically located in close proximity (e.g., within a few inches to two feet) to the surface on which the marking material is dispensed. Thus, tracking the position of the marking material dispenser or a portion of the marking device near the marking material dispenser may provide an indication of the location, size and/or shape of any resulting mark in that the distance traveled by the marking device provides an indication of the size and shape of the mark. In some embodiments, it may be preferable to track the location of the tip of the marking device when assessing the size and/or shape of any marks formed, for example when the marking material dispenser is located near the tip of the marking device. In addition, determining the motion of the tip of the marking device by tracking changes in the location of the tip may allow for assessment of technician manipulation of the marking device, which may be used for quality control, training purposes, and standard setting, among other things.

Thus, according to another aspect of the present invention, methods and apparatus are provided for determining the location of the tip of a marking device. However, it should be appreciated that the tip of the marking device is a non-limiting example of a specific point of a marking device for which it may be desirable to know the location, as, for example, other portions of the marking device may be closer to the point from which marking material may be dispensed depending on the configuration of the marking device. The methods and apparatus described herein may be applied equally well to the determination of any point of interest on the marking device by placing the transmitter 122 at or near the point of interest.

Figure 9:
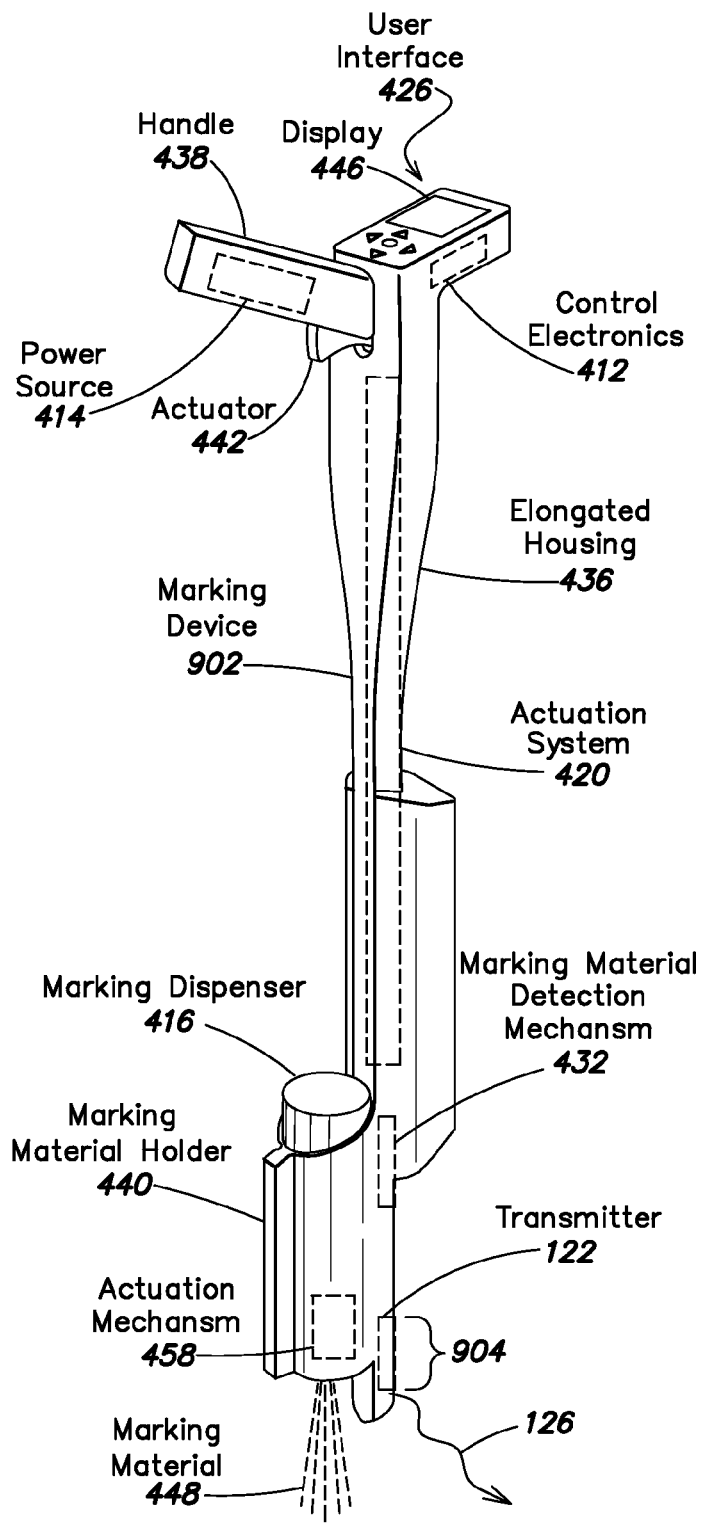
FIG. 9 illustrates a perspective view of a marking device including a transmitter located at the tip of the marking device to transmit a wireless signal, according to one non-limiting embodiment of the present invention.

According to one embodiment of the present invention, a marking device may include a transmitter (e.g., transmitter 122) located substantially at the tip of the marking device in close proximity to the marking dispenser of the marking device. In this manner, the location of the tip of the marking device may be tracked utilizing the triangulation techniques described herein and may provide a suitable indication of the location of marking material dispensed by the marking device. FIG. 9 illustrates a non-limiting example.

As shown, the marking device 902 is substantially similar to the marking device 121 of FIG. 4. However, in contrast to the marking device 121 in which the transmitter 122 is positioned substantially near the top of the marking device, the transmitter 122 is instead configured near the tip 904 of the marking device 902 in close proximity to the point at which the marking material exits the marking dispenser 416. In this manner, performing triangulation according to the various aspects described herein provides a location of the tip 904 of the marking device which may serve as an approximation of the location of any dispensed marking material 448.

In those embodiments in which the location of locate marks formed during a marking operation is desired, determination of the location of the marking device (or a portion of the marking device, such as the tip) may be limited to those times when marking material is being dispensed. As previously described, in some embodiments marking material is dispensed in response to actuation of an actuator of the marking device. Thus, according to one embodiment, the signal 126 is transmitted in response to actuation of the actuator, such that the location of the marking device is determined while marking material is dispensed and therefore the location of marks formed may be determined. Referring to FIG. 5 as a non-limiting example, the processor 418 may be programmed to allow the signal 126 of transmitter 122 to be transmitted only during actuations of marking device 121, which allows the positions of individual markings that are dispensed to be determined. However, various other manners for controlling the transmission of signal 126 to coincide with actuations of an actuator of the marking device are possible.

The use of a triangulation system of the types described herein to determine the location of a marking device may be useful for various reasons, as previously described. For example, an electronic record of the location of the marking device may be made. The location information may be useful to document and prove that a marking operation was performed and the manner in which the operation was performed. The information may also be useful to assess the skill and/or behavior of a locate technician, for example in terms of whether the technician operates efficiently at a work site and/or what motions they make with the marking device, among other characteristics of performance of a marking operation. Also, as mentioned, the aspects described herein may allow for analyzing the positions of locate marks that are dispensed during locate operations to assess the quality of locate operations, among other uses. A more detailed discussion of various manners in which quality of a locate operation may be assessed, and which may be applied using information produced by use of the various aspects described herein, may be found in, for example, U.S. Patent Publication 2010-0010862-A1, previously incorporated herein by reference.

Use of triangulation technology as described herein may provide highly accurate determination of the location of a marking device. For example, RFID technology may be used to determine the location of the marking device within +/−15 cm, although other spatial resolutions are possible. Such resolutions may be better in some instances than could be achieved using GPS technology.

While various examples have been described above in terms of components and methods of operation of a triangulating system according to aspects of the present invention, it should be appreciated that alternatives are possible. For example, similar functionality may be achieved utilizing WiFi technology. For example, the transmitter 122 may be a WiFi transmitter. The receiving antenna 116 and the receiving antenna 118, in combination with receiver 114, may be implemented as WiFi receiver technology. Thus, a WiFi system may be configured at a work site and utilized to track the location of the marking device during the marking operation. Other alternatives are also possible.

Also, while various embodiments of marking devices having a single transmitter have been described, it should be appreciated that not all embodiments are limited in this respect. As mentioned previously, it may be desirable to position a transmitter on a marking device at a particular point of interest of the marking device, such as the tip of the marking device. In some instances, it may be desirable to know the location of two or more points of interest of the marking device, such as the top of the marking device and the tip of the marking device. Thus, according to one embodiment, two or more transmitters of the type(s) previously described herein may be positioned at respective locations on a marking device. They may be operated in the manner previously described herein with respect to the described transmitters, and thus the location of two or more points of the marking device may be determined. Accordingly, it should be appreciated that those aspects of the present invention relating to a marking device including a transmitter for transmitting a signal to be used to determine the location of the marking device are not limited in the number of transmitters included on the marking device.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, some of the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, an intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for tracking location of a marking device used to mark a presence or an absence of an underground facility during performance of a marking operation at a work site, the system comprising:
    the marking device comprising a transmitter configured to transmit a wireless signal;
    a first receiving system coupled to a vehicle at the work site, disposed at a first stationary location on the vehicle, and configured to receive the wireless signal and produce a first output signal;
    a second receiving system coupled to the vehicle, disposed at a second stationary location on the vehicle, and configured to receive the wireless signal and produce a second output signal;
    at least one processor communicatively coupled to the first receiving system and the second receiving system to receive the first output signal and the second output signal and to execute a triangulation algorithm utilizing the first output signal and the second output signal;
    a marking material dispenser; and
    an actuator configured to initiate dispensing of marking material from the marking material dispenser upon actuation of the actuator;
    wherein the transmitter is configured to transmit the wireless signal upon actuation of the actuator.

2. The system of claim 1, wherein:
    the wireless signal is a radio frequency signal;
    the transmitter is a radio frequency transmitter;
    the first receiving system includes a first receiving antenna; and
    the second receiving system includes a second receiving antenna.

3. The system of claim 1, wherein:
    the wireless signal is an acoustic signal;
    the transmitter is an acoustic transmitter;
    the first receiving system includes a first acoustic transducer; and
    the second receiving system includes a second acoustic transducer.

4. The system of claim 1, wherein the wireless signal comprises an identification of the marking device.

5. The system of claim 4, wherein the marking device further comprises storage storing the identification in electronic form.

6. The system of claim 5, wherein the transmitter is a radio frequency identification (RFID) tag, and wherein the storage is the RFID tag.

7. The system of claim 1, further comprising the vehicle.

8. The system of claim 1, wherein the transmitter is a passive transmitter, and wherein the system further comprises an interrogator configured to cause the transmitter to transmit the wireless signal.

9. The system of claim 8, wherein the interrogator comprises at least one of the first antenna and the second antenna.

10. The system of claim 1, further comprising a location tracking system positioned at a known location relative to the first receiving antenna and the second receiving antenna.

11. The system of claim 10, wherein the location tracking system comprises a global positioning system (GPS) receiver.

12. The system of claim 11, wherein the GPS receiver is coupled to the at least one processor and configured to provide an output signal indicative of location of the GPS receiver to the at least one processor.

13. The system of claim 1, wherein the marking device comprises a tip configured to be disposed proximate ground when the marking device is in use, wherein the transmitter is mechanically coupled to the marking device and disposed near the tip, and wherein the wireless signal is indicative of a location of the tip of the marking device.

14. The system of claim 13, wherein the marking device further comprises a marking material dispenser configured proximate the tip of the marking device.

15. A system for tracking location of a marking device used to mark a presence or an absence of an underground facility during performance of a marking operation at a work site, the system comprising:
   the marking device comprising:
      a tip configured to be disposed proximate ground when the marking device is muse;
      a marking material dispenser disposed proximate the tip of the marking device and configured to dispense a marking material;
      an actuator operable by a user of the marking device to dispense the marking material;
      a wireless transmitter disposed proximate the tip of the marking device and coupled to the actuator, wherein the transmitter is configured to, in response to actuation of the actuator, transmit a wireless signal including an identification of the marking device;
   a first receiving antenna coupled to a vehicle and disposed at a first stationary location of the work site and configured to receive the wireless signal and produce a first output signal;
   a second receiving antenna coupled to the vehicle and disposed at a second stationary location of the work site and configured to receive the wireless signal and produce a second output signal;
   a global positioning system (GPS) receiver disposed at a third stationary location of the work site and configured to output a third output signal identifying the third stationary location; and;
   at least one processor communicatively coupled to the first receiving antenna, the second receiving antenna, and the GPS receiver to receive the first output signal, the second output signal, and the third output signal, and configured to execute a triangulation algorithm utilizing the first output signal, the second output signal, and the third output signal to determine a location of the tip of the marking device.

16. The system of claim 15, wherein the wireless transmitter is a radio frequency identification (RFID) tag.

17. The system of claim 16, wherein the RFID tag is a passive RFID tag, and wherein the system further comprises an RFID reader disposed at the work site remotely from the marking device and configured to read the RFID tag.

18. A method of tracking a location of a marking device, comprising an actuator, the marking device being used to mark a presence or an absence of an underground facility during performance of a marking operation at a work site, the method comprising:
   transmitting a wireless transmission signal from the marking device, upon actuation of the actuator, to multiple receivers disposed at respective fixed locations at a vehicle at the work site, the multiple receivers forming at least part of a triangulation system; and
   triangulating, based on reception of the wireless transmission signal by the multiple receivers, the location of the marking device.

19. The method of claim 18, wherein triangulating the location of the marking device further comprises transmitting a wireless interrogation signal to the marking device to cause the marking device to send the wireless transmission signal.

20. The method of claim 18, wherein the marking device comprises a marking material dispenser for dispensing marking material to mark the presence or the absence of the underground facility, and where triangulating the location of the marking device comprises triangulating a location of a portion of the marking device substantially corresponding to the marking material dispenser.

21. The method of claim 20, wherein triangulating the location of the portion of the marking device comprises triangulating the location of the portion only when marking material is being dispensed.

22. The method of claim 18, further comprising dispensing marking material from the marking device to mark the presence or the absence of the underground facility, and wherein triangulating the location of the marking device is performed in connection with the dispensing of the marking material.

* * * * *